US012417177B1

(12) United States Patent
Lei et al.

(10) Patent No.: US 12,417,177 B1
(45) Date of Patent: Sep. 16, 2025

(54) SYSTEMS AND METHODS FOR MULTICASTING DATA

(71) Applicant: NVIDIA Corporation, Santa Clara, CA (US)

(72) Inventors: Ming Liang Milton Lei, Santa Clara, CA (US); Jeffery Michael Schottmiller, Raleigh, NC (US); Manan Patel, San Jose, CA (US); Pritha Ghoshal, Apex, NC (US); Michael Alan Fetterman, Lancaster, MA (US); Robert Ohannessian, Jr., Austin, TX (US); Praveen Kumar Kaushik, Karnataka (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/604,184

(22) Filed: Mar. 13, 2024

(51) Int. Cl.
G06F 12/0804 (2016.01)
G06F 12/0868 (2016.01)
G06F 12/0875 (2016.01)

(52) U.S. Cl.
CPC ...... G06F 12/0804 (2013.01); G06F 12/0868 (2013.01); G06F 12/0875 (2013.01)

(58) Field of Classification Search
CPC ............ G06F 12/0804; G06F 12/0868; G06F 12/0875
See application file for complete search history.

(56) References Cited

U.S. PATENT DOCUMENTS 11,507,506 B2 * 11/2022 Kipp .................... G06F 12/0804
2018/0302468 A1 * 10/2018 Hu ......................... H04L 67/565

* cited by examiner

Primary Examiner — Aracelis Ruiz
(74) Attorney, Agent, or Firm — Lowenstein Sandler LLP

(57) ABSTRACT

A first instruction to load a first data into a first register file associated with a first subpartition unit is received. A second instruction to load the first data into a second register file associated with a second subpartition unit is received. The first instruction and the second instruction are coalesced into a first entry of a request coalescer based on instruction identifiers. The first entry is associated with the first data. Responsive to a determination that the first data is available in the cache, the first data is multicast from the cache to the first register file and the second register file.

20 Claims, 13 Drawing Sheets

```
req = read request
coalEntry[] = coalescing table entries.
N = number of coalescing table entries.

match[] = coalEntry[].valid & (req.dstUR == coalEntry[].dstUR)
 & (req.rdSz == coalEntry[].rdSz) & (req.scbd == coalEntry[].scbd)
 & (req.byteOffset == coalEntry[].byteOffset)
 & (req.setID == coalEntry[].setID) & (req.wayID == coalEntry[].wayID);
coalescible[] = ~coalEntry[].lock & ~coalEntry[].warpMask[req.warpID]
match_and_coalescible[] = match[] & coalescible[];
lets_coalesce = |(match_and_coalescible[]);

stallOnSameLDCUsameWarp = ~coalEntry[].lock & coalEntry[].warpMask[req.warpID] & match[];
needNewEntry = &(~match[]);
hasUnusedEntry = |( ~coalEntry[].valid );

if (lets_coalesce) then
    parallel_foreach_coalescing_entry {
        if (match_and_coalescible[i]) coalTarget = i, where i = 0..N
    }
    coalEntry[coalTarget].warpMask[req.warpID] = 1;
```

FIG. 3B

```
else if (stallOnSameLDCUsameWarp) then
    stallPipeline = True;  // Cannot coalesce. Same warp issue same exact instruction. Stall pipeline.
else if (newEntry) then
    if (hasUnusedEntry) then
        entryToUse = trail_one_to_index (coalEntry[].valid);
        coalEntry[entryToUse].valid = True;
        coalEntry[entryToUse].setID = allocated_set;
        coalEntry[entryToUse].wayID = allocated_way;
        coalEntry[entryToUse].dstUR = req.dstUR;
        coalEntry[entryToUse].rdSz = req.rdSz;
        coalEntry[entryToUse].scbd = req.scbd;
        coalEntry[entryToUse].byteOffset = req.byteOffset;
        coalEntry[entryToUse].warpMask[req.warpID] = 1;
        coalEntry[entryToUse].lock = False;
        coalEntry[entryToUse].dataReady = req.hit;  // is tag lookup result hit?
        Set2Youngest(entryToUse);
    else
        stallPipeline = True;  // Need new entry but no unused entry -> stall pipeline
    endif
endif
```

```
┌─────────────────────────────────────────────────────────────────────────┐
│ Receive a first instruction to load a first data into a first uniform   │
│ register file associated with a first subpartition unit                 │
│                              402                                        │
└─────────────────────────────────────────────────────────────────────────┘
                                    ↓
┌─────────────────────────────────────────────────────────────────────────┐
│ Receive a second instruction to load the first data into a second       │
│ uniform register file associated with a second subpartition             │
│                              404                                        │
└─────────────────────────────────────────────────────────────────────────┘
                                    ↓
┌─────────────────────────────────────────────────────────────────────────┐
│ Coalesce the first instruction and the second instruction into a first  │
│ entry of a request coalescer, wherein the first entry is associated     │
│ with the first data                                                     │
│                              406                                        │
└─────────────────────────────────────────────────────────────────────────┘
                                    ↓
┌─────────────────────────────────────────────────────────────────────────┐
│          Determine that the first data is available in a cache          │
│                              408                                        │
└─────────────────────────────────────────────────────────────────────────┘
                                    ↓
┌─────────────────────────────────────────────────────────────────────────┐
│ Responsive to determining that the first data is available in the cache,│
│ multicasting the first data to the first uniform register file and the  │
│ second uniform register file.                                           │
│                              410                                        │
└─────────────────────────────────────────────────────────────────────────┘
```

FIG. 4

SYSTEMS AND METHODS FOR MULTICASTING DATA

FIELD OF THE INVENTION

Embodiments of the present disclosure generally relate to parallel processing systems. Specifically, embodiments of the present disclosure relate to parallel processing systems and methods for multicasting data.

BACKGROUND

Parallel processing in high-performance computing (HPC) systems involve the simultaneous execution of multiple computational tasks or operations. This is done by breaking down larger computations into smaller, independent, subtasks that be processed concurrently by multiprocessors. In some instances, parallel processing involves distributed computing, such that task are distributed across multiple computing clusters. Each cluster may operate independently, and communication can be facilitated to share results.

BRIEF DESCRIPTION OF THE DRAWINGS

FIG. 3B illustrates example pseudocode to coalesce a request into the example request coalescer CAM table of FIG. 3A, in accordance with at least one embodiment of the present disclosure.

FIG. 3C illustrates a continuation of the example pseudocode to coalesce the request into the example request coalescer CAM table of FIG. 3A, in accordance with at least one embodiment of the present disclosure.

FIG. 4 illustrates a flowchart of a method for multicasting data, in accordance with at least one embodiment of the present disclosure.

DETAILED DESCRIPTION

Figure 1:
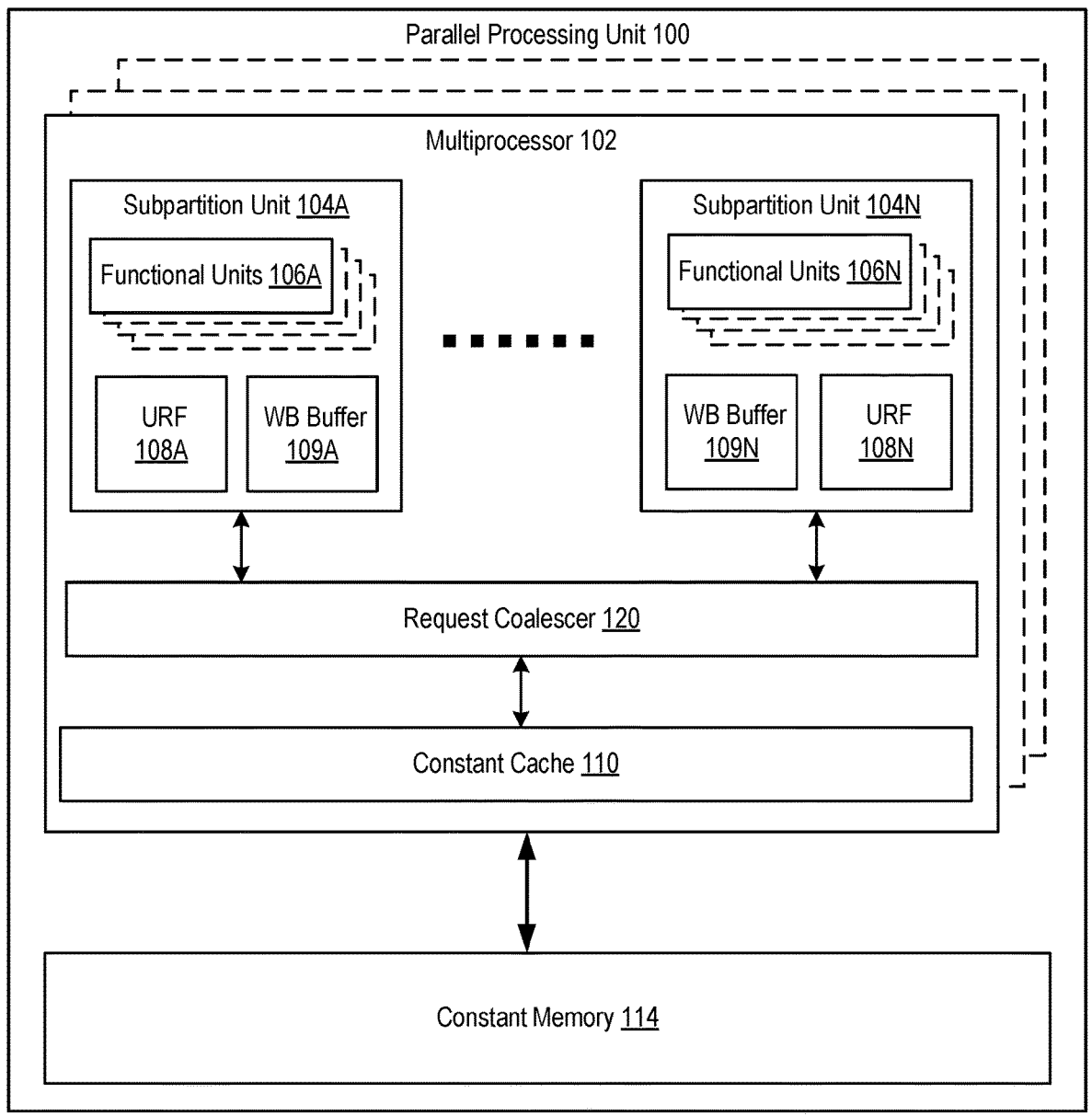
FIG. 1 illustrates a parallel processing unit, in accordance with at least one embodiment of the present disclosure.

HPC systems may use specialized hardware architectures, such as parallel processing units (PPUs), to enhance parallel processing abilities. PPUs are designed to extract high performance using a large number of small, parallel execution threads on dedicated programmable multiprocessors. In PPUs, a group of threads, such as a warp, may execute the same instruction (e.g., the same instruction executed by different threads) concurrently on a multiprocessor with different input data. This execution model is referred to as Single Instruction, Multiple Thread (SIMT) and is commonly utilized in parallel computing. PPUs are designed to execute a program (e.g., a kernel, a shader program, etc.) in parallel by many warps on the PPU in which each thread of a warp typically operates on a different portion of data. In some instances, more than one multiprocessor may request the same data at different points of executing the program. To account for these situations, some PPUs may include one or more specialized memory spaces, such as a constant cache and associated uniform registers, that are optimized for storing and accessing constant data. The constant cache may be a read-only memory space configured to store constant data that remains the same across multiple warps during execution of a program. Constant data can include mathematical constants, program parameters, transformation matrices, coefficients, and any other data that remains constant during program execution. Constant data may be read from the constant cache and written into uniform registers (referred to as "writeback" herein) associated one or more threads across warps requesting the constant data. However, servicing multiple threads requesting the same constant data can create a bandwidth issue. For example, the constant cache may have a writeback bandwidth of 8 bytes per clock cycle. A first, second, third, and fourth thread may request the same 32 bytes of constant data. Each of the requests may be serviced individually for a total writeback bandwidth of 16 clock cycles.

To mitigate the bandwidth associated with writeback of constant data, some conventional techniques may match addresses of incoming requests for constant data. Matching addresses can be coalesced, and associated constant data can be multicast to corresponding uniform registers. Coalescing is the process of combining multiple memory access requests, such as request to read data from a constant cache, into a single memory access requests. In the context of the present disclosure, multicasting refers to the process of sending constant data from a constant cache to multiple requestors simultaneously for writeback into uniform registers. Uniform registers can generally refer to on-chip memory structures to store variables or values that remain the same across a group of parallel threads. To match addresses among incoming requests, some conventional systems may implement wide address matching logic with an associated area cost. For example, the system may implement address matching logic to match 64-bit memory addresses. Area allocated for address matching logic can be significant for a constant cache that is heavily replicated by the count of multiprocessors on the PPU. Area is an important consideration in PPU design as it is a factor in cost efficiency, power efficiency, heat dissipation, and the like.

In another conventional solution, a single thread may programmatically orchestrate multicasting of data. The PPU may implement software to coordinate among threads prior to memory read instruction at issue. Designing such software can be challenging and introduce significant overhead in terms of design complexity.

Another conventional solution may implement mandatory aging of requests to writeback constant data from the constant cache into uniform registers in order to widen a window in which writeback requests may be coalesced.

However, using mandatory aging to coalesce writeback requests can increase a static latency for thread execution. Additionally, after coalescing, the data still must be broadcast to uniform registers of associated multiprocessor cores to achieve the desired writeback bandwidth reduction. Conventional techniques may blindly broadcast data for writeback to the requestors at the same time to achieve the desired reduced writeback bandwidth. Such a solution requires all requestors to have free cycle for uniform register writeback at the same time, and coordinating time of writeback with each uniform register associated with various multiprocessors can add complexity.

Aspects and implementations of the present disclosure address the above deficiencies and other deficiencies of conventional PPUs by providing a technique that enables a PPU to coalesce writeback requests using a reduced number of bits. Constant data can be multicast to corresponding uniform register files of disjoint cores of a multiprocessor. A PPU can integrate several independent multiprocessors, such as streaming multiprocessors (SMs) in a single die. Each multiprocessor may include a request coalescer and a constant cache accessible to all subpartition units and associated processing cores disposed on the multiprocessor. Each subpartition unit can execute a warp, allowing for parallel execution of warps. Subpartition units can issue writeback requests to the request coalescer to read data from the constant cache and write the data to one or more uniform registers associated with the subpartition. In some embodiments, the writeback request is associated with an instruction to perform an operation using the requested data. Accordingly, the terms request and instruction may be used interchangeably herein by way of convenience, noting that aspects and implementations of the present disclosure may generally apply to coalescing requests to access constant data. In some embodiments, the writeback requests can be coalesced by the request coalescer according to an instruction identifier. When the data is available in the cache, the request coalescer can cause the data to be multicast to uniform registers associated with requests having the same instruction identifier. In some embodiments, the instruction identifier can include a cacheline identifier and a byte offset. Accordingly, the instruction identifier used to match writeback requests can be reduced from a memory address (e.g., 64 bits) to a cacheline identifier (e.g., 9 bits) and a byte offset (e.g., 16 bits).

In at least one embodiment, to multicast the constant data, the request coalescer may simultaneously write the data to one or more writeback buffers. The writeback buffers can store the data until corresponding uniform register files are available for writeback. For example, a first request and a second request may request the same constant data. The request coalescer may coalesce the first request and the second request into a same entry of the request coalescer. Responsive to the constant data being available in the constant cache, the request coalescer can write the constant data to a first writeback buffer associated with the first request and a second writeback buffer associated with the second request. When a first uniform register corresponding to the first request is available for writeback, the first writeback buffer can load the constant data into the first uniform register. When a second uniform register corresponding to the second request is available, the second writeback buffer can load the constant data into the second uniform register. As such, temporarily storing constant data in generic writeback buffers can allow multicasting of constant data to separate cores of a multiprocessor without synchronizing uniform registers for writeback.

Advantages of the technology disclosure herein include, but are not limited, decreased bandwidth associated with writeback of constant data into uniform register files. This can be accomplished by coalescing multiple writeback requests using minimal bits for request/instruction identification and matching. Additionally, leveraging a generic writeback buffer for multicasting data can negate complexity and hardware associated with synchronized uniform register writeback. Accordingly, aspects and implementations of the present disclosure can provide flexibility with comparatively little complexity when coalescing writeback requests and multicasting data to uniform registers to reduce writeback bandwidth.

It should be noted that various aspects of the above referenced methods and systems are described in detail herein below by way of example, rather than by way of limitation. The embodiments and examples provided below may reference writeback requests/instructions associated with particular subpartition units of a multiprocessor. However, writeback requests can generally be associated with a thread executing on any processing core(s) associated with a PPU. Additionally, the embodiments and example provided below may reference uniform register associated with particular subpartition units. However, uniform registers can be associated with a multiprocessor, a subpartition unit, an individual thread, or any processing unit of a PPU. Further, it is appreciated that a warp is used herein by way of example, and not by way of limitation, noting that aspects and implementations of the present disclosure can generally be applied to groups of threads that are scheduled together. Additionally, it is appreciated that uniform registers are used herein by way of example, and not by way of limitation. Noting that aspects and implementations of the present disclosure can utilize other registers for multicasting data. For example, data can be multicast to a general-purpose register file according to techniques described herein.

FIG. 1 illustrates a parallel processing unit (PPU) 100, in accordance with at least one embodiment of the present disclosure. The PPU 100, for example, may include a graphical processing unit (GPU). As illustrated in FIG. 1, the PPU 100 includes one or more multiprocessor(s) 102. Each multiprocessor 102, for example, may be a streaming multiprocessor (SM), a compute unit (CU), a many integrated core (MIC), and the like. Each of the multiprocessors 102 includes, without limitation, multiple subpartition units 104A through 104N (referred to generally as "subpartition unit(s) 104" herein), a request coalescer 120, and a constant cache 110.

Warps assigned to the multiprocessor 102 are distributed between the subpartition units 104. Each of the subpartition units 104 may be assigned any number of warps, however, a given warp may only be assigned to one subpartition unit 104. As illustrated, each subpartition unit 104 may include, without limitation, multiple functional units 106A through 106N (referred to generally as "functional unit(s) 106" herein), a uniform register file (URF) 108A through 108N (referred to generally as "URF(s) 108" herein), and a writeback buffer 109A through 109N (referred to generally as "WB Buffer(s) 109" herein). Each of the functional units 106 may include multiple processing cores (e.g., Compute Unified Device Architecture (CUDA) cores) to execute separate threads, allowing for parallel processing. In at least one embodiment, the functional units 106 may operate according to a Single-Instruction, Multiple Thread (SIMT) architecture. For example, all threads within a warp execute the same instruction at the same time, but may operate on different data.

In at least one embodiment, the functional units 106 may perform a variation of computations, such as floating point 32-bit precision arithmetic, floating point 16-bit precision arithmetic, integer arithmetic of varying precisions, and the like. In at least one embodiment, the functional units 106 may include one or more tensor cores (not illustrated) to perform matrix multiplication operations using mixed-precision arithmetic. For example, the one or more tensor cores may operate on one low-precision formats, such as half-precision floating-point (FP16) to accelerate computation.

As indicated above, each of the subpartition units 104 may include a uniform register file 108. The uniform register file 108 is collections of registers used to store temporary data, intermediate results, operands during computation, and/or constant data. The uniform register file (URF) 108 is a shared memory resource that includes, without limitation, any number of uniform registers and any number of read and/or write ports. Each uniform register in the URF 108 is independently accessible to all threads included in a warp executing on a corresponding subpartition unit 104. The URF 108 may be implemented in any technically feasible manner. In an alternative embodiment, the uniform registers included in the URF 108 may be arranged and assigned to threads and/or warps in any technically feasible manner. In at least one embodiment, each thread running on a given functional unit 104 may use a dedicated set of registers separate from the URF 108 associated with the thread. In at least one embodiment, these registers may be private to the thread, providing a dedicated space for storing data associated with the thread.

It is appreciated that the number of multiprocessors 102 in the PPU 100, the number of subpartition units 104 in a single multiprocessor 102, and the number of functional units 106 in a subpartition unit 104 are not limited. Each subpartition unit 104 in a multiprocessor 102 may include a URF 108 and may have access to the constant cache 110 for that multiprocessor 102. In at least one embodiment, as in the embodiment illustrated in FIG. 1, the constant cache 110 may be a part of a shared/local memory associated with that multiprocessor 102. In some other embodiments, the constant cache 110 may be separate from a shared memory associated with that multiprocessor 102.

In some embodiments, the constant cache 110 may be used to stored constants or values that do not change during execution of a kernel or shader program. These constants, for example, may include parameters, coefficients, or any other data that remains constant across a multiple warps. Accordingly, the constant cache 110 may be a read-only cache located closer to processing units/cores than global memory, providing faster access times for threads that access the same constant data. In some embodiments, values stored within the constant cache 110 may be updated. For example, a kernel/shader program may update a value of a global memory address associated with the constant cache and issue invalidates to the constant cache 110 to allow the constant cache 110 to observe updated values. In some embodiments, the constant cache 110 may be located on a main structural unit (e.g., a Graphics Processing Cluster (GPC)) of the PPU 100 and associated with multiple multiprocessors 102 (e.g., SMs). In some embodiments, the constant cache 110 may be associated with a single multiprocessor 102, as illustrated with respect to FIG. 1. For example, each constant cache 110 may be associated with a single multiprocessor 102. The constant cache 110 may generally refer to a caching mechanism associated with a constant memory across an entire memory hierarchy of the PPU 100.

In at least one embodiment, the multiprocessors 102 may access a global memory (not illustrated) that is external to the PPU 100 through a global memory interface. The global memory may include a hierarchical cache memory (e.g., L2 cache and/or L3 cache) and a dynamic random-access memory (DRAM). In at least one embodiment, the global memory may include a memory management unit (MMU), an X-Bar or hierarchical cross-bar interconnect network, a memory partition unit, and/or memory described with reference to FIGS. 6, 7A, and 7B.

Multiple functional units 104 in each of the multiprocessors 102 are configured to process a plurality of threads in parallel. A thread (e.g., a thread of execution) is an instantiation of a set of instructions or a kernel configured to be executed by the functional units 104 on a particular data set. Threads of a thread block may be executed concurrently, and multiple thread blocks may be executed concurrently. In some embodiments, single-instruction multiple data (SIMD) instruction issue techniques are used to support parallel execution of a large number of threads without providing multiple independent instruction units. In other embodiments, single-instruction multiple-thread (SIMT) techniques are used to support parallel execution of a large number of generally synchronized threads, using a common instruction unit configured to issue instructions to a set of cores.

Each of the functional units 104 may connect to a URF 108 and a constant cache 110 via an interconnect network, for example, a hierarchical cross-bar with one or more read and/or write crossbars. The constant cache 110 may provide low-latency on-chip memory near the subpartition units of a multiprocessor 102. The uniform register file 108 may include data registers assignable to a different functional unit of the plurality of functional units 104 and/or different warps being executed by the multiprocessor 102. The register file 108 provides temporary storage for functional units 104 on the multiprocessor 102.

The PPU 100 may support multiple address spaces including local, shared, and global address spaces to support data visibility for the threads. Additional read-only address spaces including textures may be supported. Each thread has its own per thread local or private memory which may be controlled by allocation of registers.

Subpartition units 104 may request access to constant data stored in the constant cache 110 and/or stored in the constant memory 114 through the request coalescer 120. Each subpartition unit 104 in the multiprocessor 102 is coupled the request coalescer 120 which is configured to access constant memory 114. Each request coalescer 120 has read access to a constant cache of the corresponding multiprocessor 102 by issuing requests to the memory subsystem, such as by issuing requests to a general cache controller (GCC).

When one or more of the subpartition units 104 require access to constant data stored in the constant cache 110, the software initiates a thread with a "load" or "read" instruction. The load instruction may cause constant data to be read from the constant cache 110 into one or more uniform registers of the URF 108, making it useable by all threads in the corresponding subpartition unit 104. In at least one embodiment, the constant data may be written from the constant memory 114 into the constant cache 110 in the event of cache miss.

The request coalescer 120 may coalesce multiple requests/instructions issued by one or more subpartition units 104 of a multiprocessor 102 to multicast constant data into one or more respective URFs 108. In at least one embodiment, the request coalescer 120 may include a data structure (e.g., a content addressable memory (CAM) table)

in which each entry of the request coalescer includes one or more requests/instructions to load the same constant data into respective URFs. The request coalescer 120 may coalesce multiple requests/instructions into the same entry based on an instruction identifier associated with the instructions. For example, the request coalescer may coalesce a first instruction and a second instruction with the same instruction identifier into the same entry of the request coalescer 120. Matching instruction identifiers may indicate that the first instruction and the second instruction are the same instruction (e.g., the same instruction but associated with different warps and executing on different subpartition units 104), and thus require the same constant data for execution. The request coalescer 120 may cause that same constant data to be multicast from the constant cache 110 into an URF 108A associated with the first request and an URF 108B associated with the second instruction.

The request coalescer 120 may begin a process of multicasting constant data from the constant cache 110 into respective URFs 108 by a selecting an eligible entry among multiple eligible entries. An eligible entry may be defined as an entry in the request coalescer 120 with a pending instruction to load constant data into URF(s) 108 that is currently available in the constant cache 110. When eligible entry is selected, associated constant data can be pushed into WB buffers 109 of each subpartition unit 104 associated with the selected entry. The WB buffers 109 may temporarily hold constant data scheduled for writeback into associated URFs 108. In at least one embodiment, the WB buffer 109 is a first-in, first-out (FIFO) queue. In some instances, constant data stored in the WB buffers 109 can be written into associated URFs 108 per subpartition 104 in request order.

Figure 2:
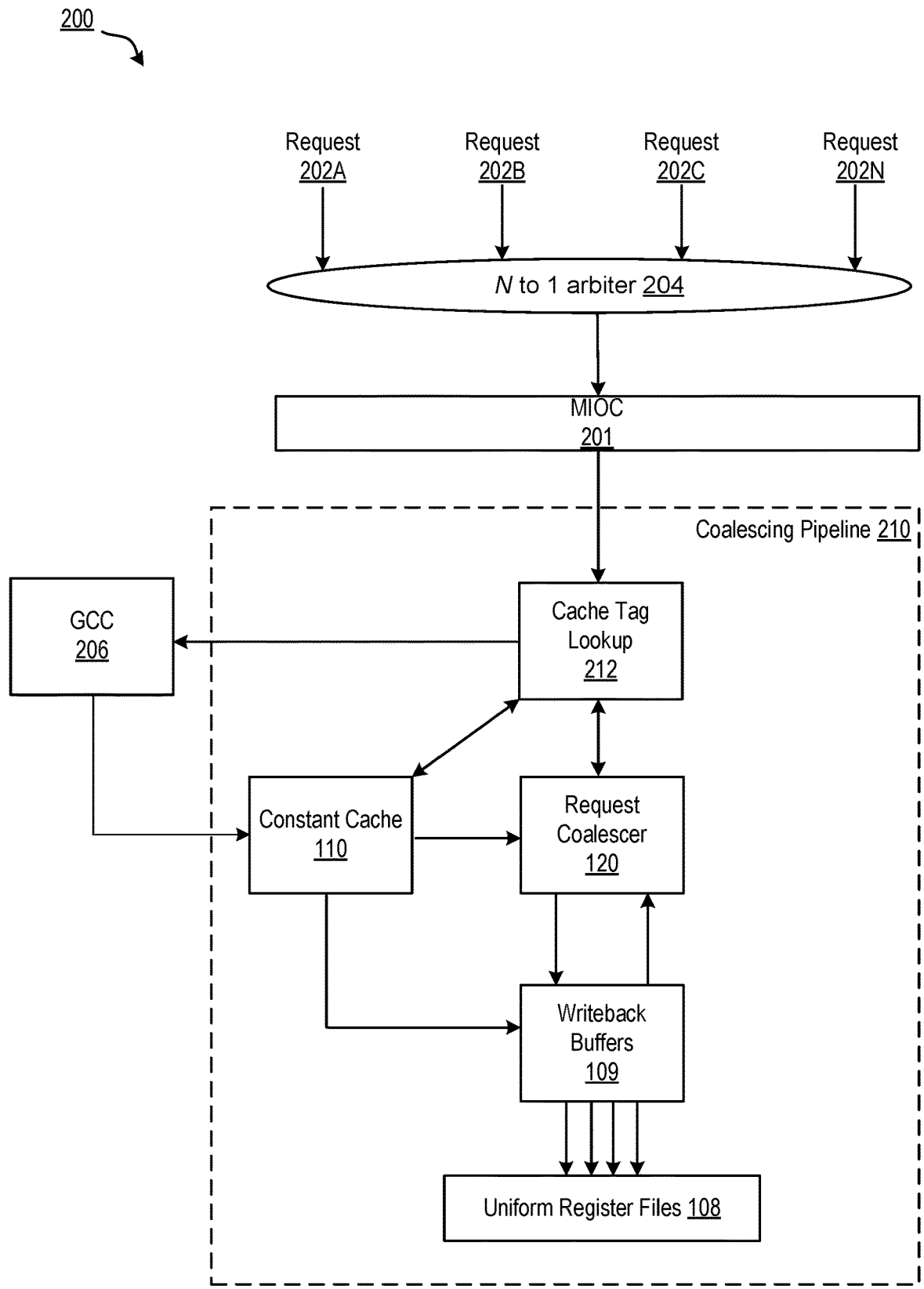
FIG. 2 illustrates a conceptual diagram as instructions requesting constant data are coalesced and constant data is multicast to associated uniform register files, in accordance with at least one embodiment of the present disclosure.

FIG. 2 illustrates a conceptual diagram 200 as instructions requesting constant data are coalesced and the constant data is multicast to associated uniform register files (URF(s)), in accordance with at least one embodiment of the present disclosure. An individual thread or a warp executing on a subpartition unit, such as subpartition unit 104 of FIG. 1, may request access to constant data from a constant cache 110 associated with a multiprocessor and load the constant data into one or more registers of a uniform register file (e.g., URF 108) associated with the multiprocessor. In at least one embodiment, multiple requests may be received in a same clock cycle. For example, a request 202A, a request 202B, a request 202C, and a request 202N (referred to generally as request(s) 202 herein) may be received in the same clock cycle. In some embodiments, each of the requests 202 may be associated with a warp that executes the same instruction simultaneously using SIMT architecture described with respect to FIG. 1. For example, the request 202A may be associated with a warp executing an instruction on a subpartition unit 104A, and the request 202B may be associated with a different warp executing an instruction on a subpartition unit 104B. One or more threads within the warp may request constant data from the constant cache to continue execution. In some instances, threads across multiple warps may request the same constant data. For example, the requests 202A and 202B may be associated with respective warps executing on respective subpartition units requesting the same constant data. In at least one embodiment, the requests 202A and 202B may be associated with a same instruction (e.g., the same instruction parameters).

In at least one embodiment, the request 202 may be an instruction associated with a thread to be executed and may also be referred to as an "instruction 202" herein. In at least one embodiment, the instruction 202 may include parameters that determine the operation to be performed such as operation code (Opcode), source operands, destination operands, and/or execution context. The Opcode, for example, may specify the operation or computation that the thread is instructed to perform, including arithmetic operations (addition, multiplication, etc.), logical operation (AND, OR, XOR, etc.), memory operations (load, store, etc.), control flow operations (branch, looping, etc.), and other instructions. The source operands are data on which the operation is to be performed or the address of the data, including registers, constants, data from global memory, etc. The destination operand may include the location where the result of the operation is to be stored, such as a register, a location in device memory, etc. The execution context may include information pertaining to a current state of the thread, including a program counter (PC), instruction pointer, register value, or the like.

N to 1 arbiter 204 may arbitrate access into the coalescing pipeline 210 for coalescing of requests 202A through 202N and multicasting of associated constant data. The N to 1 arbiter 204 may be implemented using any suitable arbitration scheme, including, but not limited to, round-robin arbitration, static priority arbitration, rotational priority arbitration, fair share arbitration, dynamic priority arbitration, token passing arbitration, reservation-based arbitration, contention-based arbitration, and the like. In at least one embodiment, a Memory Input/Output Controller (MIOC) 201 may deliver instructions/requests to coalescing pipeline 210. In at least one embodiment, the arbitration may be performed by MIOC 201.

At a tag lookup 212 stage of the coalescing pipeline 210, a tag lookup may be performed to determine whether a requested constant is present in the constant cache 110. An address included in the request 202 may be partitioned into a tag, an index, and an offset to identify the location of the requested constant in the constant cache 110. In at least one embodiment, a general cache controller (GCC) 206 may perform the tag lookup by comparing the tag of the address with tags stored in the constant cache 110, where each cache line in the constant cache 110 includes an associated tag. If the compare results in a match, it is a cache hit. If the compare does not result in a match, it is a cache miss. In at least one embodiment, the constant cache 110 is connected to the general cache controller 206 (GCC) through an interface. In the event of a miss on the constant cache 110, a request may be issued to the GCC 206 to load data from the constant memory 114 into the constant cache 110 and the GCC 206 can manage the transfer of constant data from the constant memory to the constant cache 110.

Whether the tag lookup 212 stage results in a cache hit or a cache miss, the request 202 may be stored in a request coalescer 120 pending writeback of the constant data into URF(s) 108. According to implementations described herein, writeback of constant data can refer to the process of loading data from constant cache 110 to one or more URFs 108. The request coalescer 120 is a mechanism designed to merge or combine multiple requests 202 corresponding to the same constant data/same instruction such that warps issuing the same instruction are not serviced individually. Specifically, the request coalescer 120 may be a specialized hardware structure with multiple entries that each correspond to a constant data and associated instructions/requests. Each entry of the request coalescer 120 may include instructions to writeback/load the constant data into associated URFs 108. In at least one embodiment, each entry of the request coalescer 120 is associated with an instruction identifier and multiple instructions with the same instruction identifier can be coalesced into a same entry of the request coalescer 120 pending writeback.

In an illustrative example, the request coalescer 120 may be a Content Addressable Memory (CAM). Each entry of the CAM may include a lookup portion and a payload portion. The lookup portion may include an instruction identifier to match incoming requests 202 against. The instruction identifier may include any combination of instruction parameters associated with the income requests 202. For example, the instruction parameters may include cache line identifiers (e.g., a set identifier, a way identifier, etc.), a destination uniform register, a load size of a read operation of the request 202, a scoreboard identifier, a byte offset associated with the cache line, an Opcode, a cache tag identifier, and the like. Generally, each entry of the CAM may include sufficient information to ensure it is functionally correct and/or acceptable to coalesce two or more requests for constant data. The payload may include an indication of the requests 202 requesting access to the same constant data, and therefore warps issuing the same instruction. In an embodiment where each request 202 is associated with a particular warp, the payload may include a bitmask indicating warps awaiting the same constant data for writeback into associated uniform registers, as illustrated below with respect to FIG. 3.

Responsive to reception of a request 202 into the request coalescer 120, the request coalescer 120 may compare the received request 202 against existing entries of the request coalescer 120. As mentioned above, each entry of the request coalescer 120 may be associated with an instruction identifier such as one or more instruction parameters. If the instruction identifier of the request 202 matches an existing entry of the request coalescer 120, the request 202 may be merged into the existing entry. If the instruction identifiers do not match, a new entry may be allocated and associated with the instruction identifier of the request 20 and the request 202 may be merged into the newly-allocated request coalescer 120 entry.

Responsive to constant data being available in the constant cache 110, the request coalescer 120 may begin the writeback process. To begin the writeback process, the request coalescer 120 selects an entry among entries eligible for writeback. An eligible entry is an entry within the request coalescer with a pending request 202 associated with constant data available to be read out from the constant cache 110. In at least one embodiment, the request coalescer 120 may select from multiple eligible entries using an oldest-age first approach by comparing age fields associated with each eligible entry. The GCC 206 may facilitate loading constant data associated with the selected entry into associated writeback buffers 109.

The writeback buffer(s) 109 may temporarily hold constant data selected by the request coalescer 120 for writeback into associated URFs 108. In at least one embodiment, a single writeback buffer 109 can be associated with a single subpartition unit and associated URF 108, as illustrated above with respect to FIG. 1. In an illustrative example, a request 202A and a request 202B may be the same instruction associated (requesting the same constant data) with a subpartition 104A and a subpartition 104B, respectively. The request coalescer 120 can coalesce (e.g., merge) the request 202A and 202B into a given, same entry of the request coalescer 120. Responsive to the request coalescer 120 selecting the given entry for writeback, the constant data may be pushed into the writeback buffer 109A associated with the subpartition 104A and a the writeback buffer 109B associated with the subpartition 104B. Constant data can be loaded from the writeback buffers 109A and 109B to URF 108A and 108B, respectively. Accordingly, constant data can be multicast from writeback buffers 109 to URFs 108 in a single clock cycle. In at least one embodiment, when a writeback buffer 109 become full, the writeback buffer 109 can backpressure the request coalescer 120 from unloading entries into the writeback buffer 109.

In some embodiments, coalesced requests associated with a same subpartition 104 may be serialized as they are written from a writeback buffer 109 to an associated URF 108. For example, subpartition 104A may include four warps with a constant cache load instruction that are coalesced into a single entry of the request coalescer 120 entry according to coalescing pipeline 210 described above. When the entry of the request coalescer 120 is selected for writeback, associated constant data may be written to a writeback buffer 109A along with warp identifiers associated with warps of the request coalescer entry. Writeback of data from writeback buffer 109A to an associated URF 108A can be serialized for each coalesced warp across N cycles, where N is the number of coalesced warps in the writeback buffer 109A. In at least one embodiment, writeback of warps can be serialized according to warp identifiers. For example, a first warp with a warp identifier '0' may written back to URF 108A followed by a second warp with a warp identifier '1.' In at least one embodiment, writeback of warps can be serialized according to an order of coalescing.

In at least one embodiment, a given subpartition unit may include multiple URFs, associated with one or more warps executing on the given subpartition unit. For example, the given subpartition unit may include per-warp URFs such that each warp executing on the given subpartition unit utilizes a dedicated URF. In such an embodiment, the given subpartition unit may writeback data into such per-warp URFs in a single cycle. Generally, N-warps of a given subpartition unit may be merged into a set of M-URFs such that writeback serialization would require at least one cycle and at most N-cycles to writeback data.

Figure 3A:
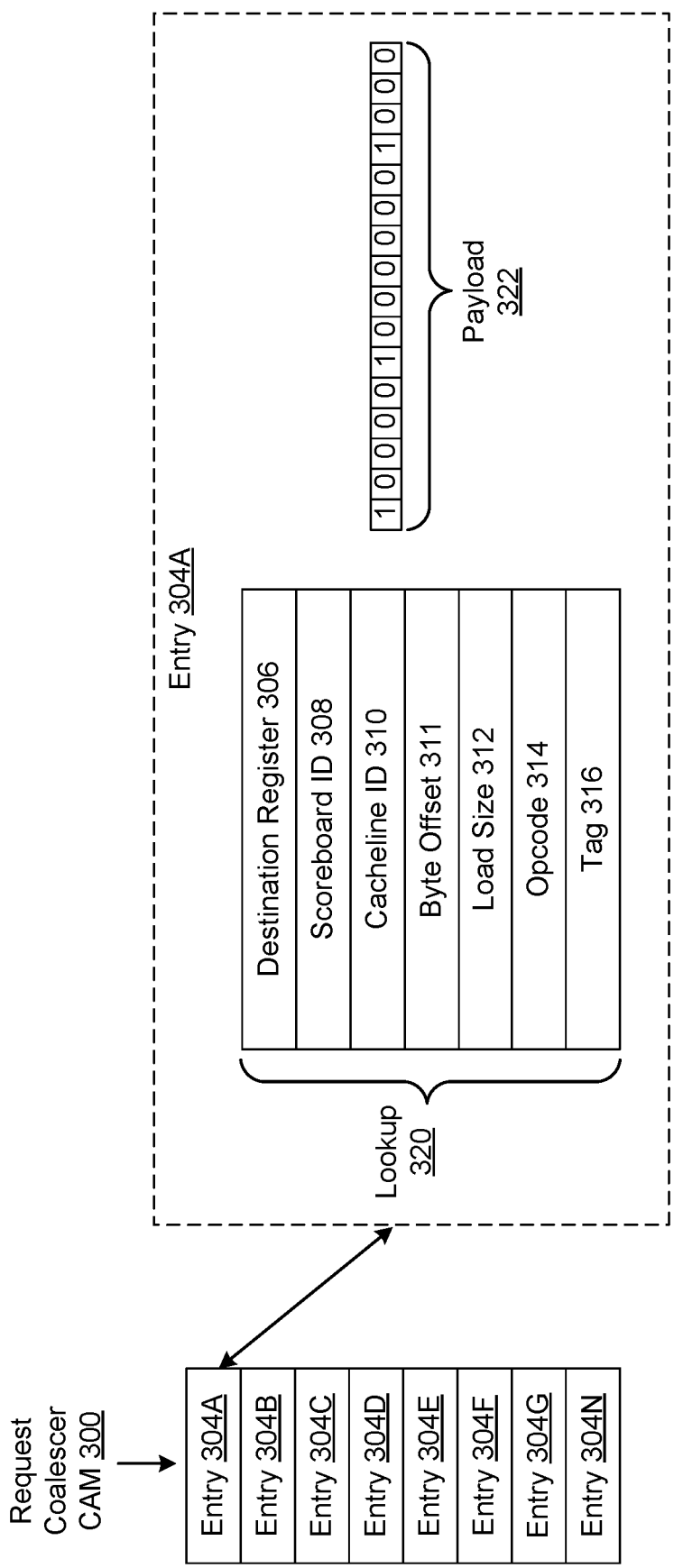
FIG. 3A illustrates an example request coalescer Content Addressable Memory (CAM) table, in accordance with at least one embodiment of the present disclosure.

FIG. 3 illustrates an example request coalescer Content Addressable Memory (CAM) table 300, in accordance with at least one embodiment of the present disclosure. In at least one embodiment, the request coalescer CAM 300 may correspond to the request coalescer 120 of FIG. 2. In at least one embodiment, the request coalescer CAM 300 may be a specialized memory for coalescing requests to write constant data from a constant cache/constant memory into associated register files, as described above. In at least one embodiment, control and management of the request coalescer CAM 300 may be facilitated through a hardware component, firmware, and/or one or more software layers.

The request coalescer CAM 300 may include multiple entries 304A through 304N (referred to generally as "entry(ies) 304" herein). Each entry may include a lookup and a payload. For example, the entry 304A may include a lookup portion 302 and a payload portion 322. The lookup portion 320 may include instruction identifiers to match against. The Lookup portion 320 may include, but is not limited to, any combination of a destination register 306, a scoreboard identifier 308, a cacheline ID 310, a byte offset 311, a load size 312, an opcode 314, and/or a tag 316. The destination register 306 may be an identifier of a destination register associated with one or more URFs 108. The scoreboard identifier 308 may include an identifier of a scoreboard to be released upon writeback. A scoreboard is a mechanism used for out-of-order instruction execution dependency tracking. The cacheline ID 310 may include a set identifier and a way identifier associated with the constant cache 110. The byte offset 311 may be an identifier of a specific byte within the cacheline where the constant data is located. The load size 312 can indicate a size of associated constant data (e.g., 32 bits, 64 bits, 96 bits, etc.). The Opcode 314 may be an instruction code that represents a specific operation to be performed by the thread. The opcode 314 may include arithmetic operations (e.g., add, multiply, etc.), logical operations (e.g., AND, OR, etc.), memory operations (e.g., load, store, etc.), and control flow operations (e.g., branch, looping, etc.).

The lookup portion 320 may include other various fields including information (e.g., metadata) not associated with an instruction identifier. In at least one embodiment, the lookup portion 320 may include a field to indicate whether the entry 304A is valid. In at least one embodiment, the portion 302 may include to indicate whether the destination register 306 is valid. In at least one embodiment, the lookup portion 320 may include an indicator of whether constant data associated with the entry 304A is available for writeback. In at least one embodiment, the lookup portion 320 may include a field that indicates whether an instruction/request in the entry 304A has a same instruction identifier as another instruction in the request coalescer CAM 300 associated with the same warp. In at least one embodiment, the lookup portion 320 may include a field that indicates an age of the entry 304A.

The payload portion 322 may include a bitmask identifying warps awaiting the same constant data associated with the entry 304A. Bit position within the bitmask can represent an identifier associated with a warp. If the bit is set to '1', the corresponding warp is indicated in the entry as awaiting the constant data; if the bit is set to '0', the corresponding warp is not awaiting constant data. In an illustrative example, the bitmask "1000010000001000" may represent a payload 322 of the entry 304A where the 0th, 5th, and 12th warp are awaiting the constant data associated with the entry 304A. It is appreciated that the request coalescer CAM 300 is used herein by way of example, and not by way of limitation, noting that other associative memory solutions and implementations of a request coalescer may be utilized to coalesce requests. For example, a request coalescer may implement a hash table, a tree structure, or other associative memories.

FIG. 3B illustrates example pseudocode to coalesce a request into the example request coalescer CAM table 300, in accordance with at least one embodiment of the present disclosure. The pseudocode is arranged to process a request through a series of if/else statements. The request is processed through a first if statement in which a for loop iterates through each entry of the CAM table 300. If the request matching an existing entry and the exiting entry is able to coalesce (coalescible), the request is coalesced into the existing entry and the process ends. The request matches the existing entry if the existing entry is valid and the destination register, read size, scoreboard ID, byte offset, set ID, and way ID of the request matches that of the existing entry. The existing entry is coalescible if the existing entry is not locked, and warp IDs of the existing entry and the request do not match.

Continuing onto FIG. 3C, else if, the warp IDs match, then the request may not coalesce, and the pipeline is stalled.

Else if, a new entry is needed in the CAM table 300, then it is determined whether the CAM table 300 has an unused entry. If the CAM table 300 has an unused entry, then a new entry may be allocated to the unused entry. Once allocated, the set ID, the way ID, the destination uniform register, the read size, the scoreboard ID, and the byte offset associated with the new entry is set to corresponding values associated with the request. Additionally, the new entry is set to valid; the new entry is unlocked; a data ready indicator is set to true if the tag associated with the request hit; the warp mask of the new entry is set to include the warp associated with the request, and the new entry is set to the youngest entry in the CAM table 300.

Else, a new entry is needed but there is no unused entry in the CAM table 300, and the pipeline is stalled.

FIG. 4 illustrates a flowchart of a method 400 for multicasting data, in accordance with at least one embodiment of the present disclosure. Although method 400 is described in the context of a processing unit, the method 400 may also be performed by a program, custom circuitry, or by a combination of custom circuitry and a program. For example, the method 400 may be executed by a GPU (graphics processing unit), CPU (central processing unit), or any processor capable of multicasting data. Furthermore, persons of ordinary skill in the art will understand that any system that performs method 400 is within the scope and spirit of embodiments of the present invention.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 402 of method 400, processing logic, such as request coalescer 120 of FIG. 1, may receive a first instruction to load a first data into a first uniform register file (URF) associated with a first subpartition unit, such as a subpartition unit 104A of FIG. 1.

At operation 404 of method 400, the processing logic may receive a second instruction to load the first data into a second URF associated with a second subpartition unit, such as a subpartition unit 104B of FIG. 1. In at least one embodiment, the first instruction and the second instruction are a same instruction. In at least one embodiment, the first instruction and the second instruction may be the same instruction in that they are the same instruction executed by different threads or warps rather than the same instance of a single instruction, as executed by a single thread. In at least one embodiment, instructions are received into the request coalescer according to an arbitration scheme, such as a round robin arbitration scheme.

At operation 406 of method 400, the processing logic may coalesce the first instruction and the second instruction into a first entry of the request coalescer based on instruction identifiers. The first entry is associated with the first data. In at least one embodiment, the coalesce the first instruction and the second instruction into the first entry of the request coalescer, the processing logic is to identify an instruction identifier associated with the first entry of the request coalescer. The processing logic is further to determine that the instruction identifier associated with the first entry matches respective instruction identifiers associated with the first instruction and the second instruction, and merge the first instruction and the second instruction into the first entry.

In at least one embodiment, instruction identifiers can include at least one of a destination register number, a write scoreboard identifier, a load size, an opcode, a cache line identifier, a cache tag identifier, or any combination thereof.

At operation 408 of method 400, the processing logic may determine that the first data is available in a cache, such as constant cache 110 of FIG. 1. In at least one embodiment, the cache is associated with the first partition unit and the second partition unit. In at least one embodiment, the constant cache is configured to stored constant data.

At operation 410 of method 400, responsive to the determination that the first data is available in the cache, the processing logic may multicast the first data to the first uniform register file and the second uniform register file. In at least one embodiment, responsive to the multicast of the first data from the cache to the first URF and the second URF, the processing logic may remove the first entry from the request coalescer. In at least one embodiment, the cache is a read only cache. In at least one embodiment, to multicast the data, the processing logic may write the data to a first writeback buffer and a second writeback buffer. The first writeback buffer can be associated with the first uniform register file, and the processing logic can write the first data to the first writeback buffer. The first writeback buffer can hold the first data until the first uniform register file is available for writeback. The second writeback buffer can be associated with the second uniform register file, and the processing logic can write the first data to the second writeback buffer. The second writeback buffer can hold the first data until the second uniform register file is available for writeback.

Parallel Processing Architecture

Figure 5:
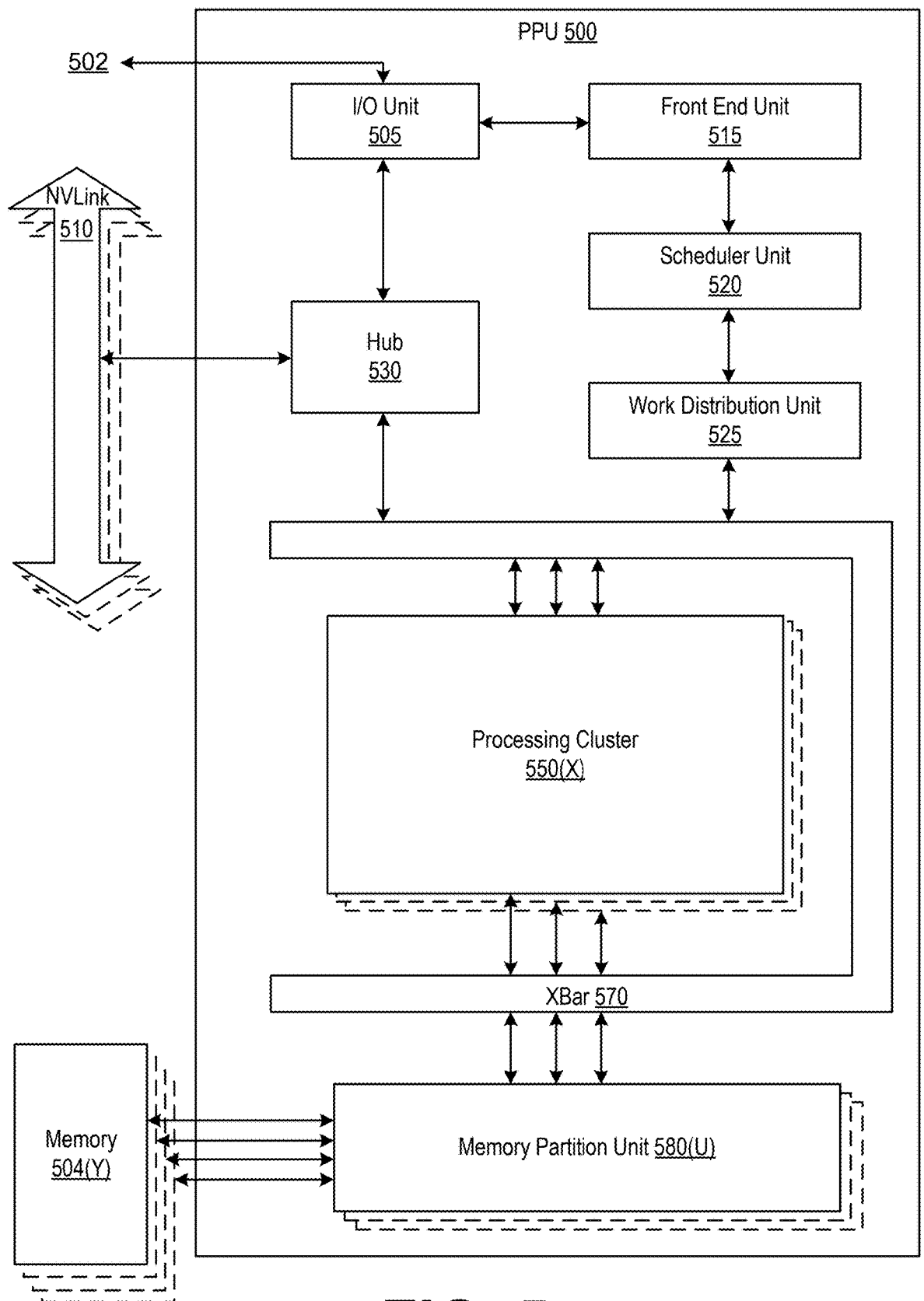
FIG. 5 illustrates a parallel processing unit, in accordance with an embodiment.

FIG. 5 illustrates a parallel processing unit (PPU) 500, in accordance with an embodiment. In an embodiment, the PPU 500 is a multi-threaded processor that is implemented on one or more integrated circuit devices. The PPU 500 is a latency hiding architecture designed to process many threads in parallel. A thread (e.g., a thread of execution) is an instantiation of a set of instructions configured to be executed by the PPU 500. In an embodiment, the PPU 500 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 500 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 500 may be configured to accelerate thousands of High Performance Computing (HPC), data center, and machine learning applications. The PPU 500 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 5, the PPU 500 includes an Input/Output (I/O) unit 505, a front-end unit 515, a scheduler unit 520, a work distribution unit 525, a hub 530, a crossbar (Xbar) 570, one or more processing clusters 550 (e.g., general processing clusters (GPCs), and one or more partition units 580. The PPU 500 may be connected to a host processor or other PPUs 500 via one or more high-speed NVLink 510 interconnect. The PPU 500 may be connected to a host processor or other peripheral devices via an interconnect 502. The PPU 500 may also be connected to a local memory comprising a number of memory devices 504. In an embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 510 interconnect enables systems to scale and include one or more PPUs 500 combined with one or more CPUs, supports cache coherence between the PPUs 500 and CPUs, and CPU mastering. Data and/or commands may be transmitted by the NVLink 510 through the hub 530 to/from other units of the PPU 500 such as one or more copy engines, a video encoder, a video decoder, a power management unit, etc. (not explicitly shown). The NVLink 510 is described in more detail in conjunction with FIG. 5B.

The I/O unit 505 is configured to transmit and receive communications (e.g., commands, data, etc.) from a host processor (not shown) over the interconnect 502. The I/O unit 505 may communicate with the host processor directly via the interconnect 502 or through one or more intermediate devices such as a memory bridge. In an embodiment, the I/O unit 505 may communicate with one or more other processors, such as one or more the PPUs 500 via the interconnect 502. In an embodiment, the I/O unit 505 implements a Peripheral Component Interconnect Express (PCIe) interface for communications over a PCIe bus and the interconnect 502 is a PCIe bus. In alternative embodiments, the I/O unit 505 may implement other types of well-known interfaces for communicating with external devices.

The I/O unit 505 decodes packets received via the interconnect 502. In an embodiment, the packets represent commands configured to cause the PPU 500 to perform various operations. The I/O unit 505 transmits the decoded commands to various other units of the PPU 500 as the commands may specify. For example, some commands may be transmitted to the front-end unit 515. Other commands may be transmitted to the hub 530 or other units of the PPU 500 such as one or more copy engines, a video encoder, a video decoder, a power management unit, etc. (not explicitly shown). In other words, the I/O unit 505 is configured to route communications between and among the various logical units of the PPU 500.

In an embodiment, a program executed by the host processor encodes a command stream in a buffer that provides workloads to the PPU 500 for processing. A workload may comprise several instructions and data to be processed by those instructions. The buffer is a region in a memory that is accessible (e.g., read/write) by both the host processor and the PPU 500. For example, the I/O unit 505 may be configured to access the buffer in a system memory connected to the interconnect 502 via memory requests transmitted over the interconnect 502. In an embodiment, the host processor writes the command stream to the buffer and then transmits a pointer to the start of the command stream to the PPU 500. The front-end unit 515 receives pointers to one or more command streams. The front-end unit 515 manages the one or more streams, reading commands from the streams and forwarding commands to the various units of the PPU 500.

The front-end unit 515 is coupled to a scheduler unit 520 that configures the various processing clusters 550 to process tasks defined by the one or more streams. The scheduler unit 520 is configured to track state information related to the various tasks managed by the scheduler unit 520. The state may indicate which processing cluster 550 a task is assigned to, whether the task is active or inactive, a priority level associated with the task, and so forth. The scheduler unit 520 manages the execution of a plurality of tasks on the one or more processing clusters 550.

The scheduler unit 520 is coupled to a work distribution unit 525 that is configured to dispatch tasks for execution on the processing clusters 550. The work distribution unit 525 may track a number of scheduled tasks received from the scheduler unit 520. In an embodiment, the work distribution unit 525 manages a pending task pool and an active task pool for each of the processing clusters 550. The pending task pool may comprise a number of slots (e.g., 32 slots) that contain tasks assigned to be processed by a particular processing cluster 550. The active task pool may comprise a number of slots (e.g., 4 slots) for tasks that are actively being processed by the processing clusters 550. As a processing cluster 550 finishes the execution of a task, that task is evicted from the active task pool for the processing cluster 550 and one of the other tasks from the pending task pool is selected and scheduled for execution on the processing cluster 550. If an active task has been idle on the processing cluster 550, such as while waiting for a data dependency to be resolved, then the active task may be evicted from the processing cluster 550 and returned to the pending task pool while another task in the pending task pool is selected and scheduled for execution on the processing cluster 550.

The work distribution unit 525 communicates with the one or more processing clusters 550 via XBar 570. The XBar 570 is an interconnect network that couples many of the units of the PPU 500 to other units of the PPU 500. For example, the XBar 570 may be configured to couple the work distribution unit 525 to a particular processing cluster 550. Although not shown explicitly, one or more other units of the PPU 500 may also be connected to the XBar 570 via the hub 530.

The tasks are managed by the scheduler unit 520 and dispatched to a processing cluster 550 by the work distribution unit 525. The processing cluster 550 is configured to process the task and generate results. The results may be consumed by other tasks within the processing cluster 550, routed to a different processing cluster 550 via the XBar 570, or stored in the memory 504. The results can be written to the memory 504 via the partition units 580, which implement a memory interface for reading and writing data to/from the memory 504. The results can be transmitted to another PPU 500 or CPU via the NVLink 510. In an embodiment, the PPU 500 includes a number U of partition units 580 that is equal to the number of separate and distinct memory devices 504 coupled to the PPU 500. A partition unit 580 will be described in more detail below in conjunction with FIG. 6B.

In an embodiment, a host processor executes a driver kernel that implements an application programming interface (API) that enables one or more applications executing on the host processor to schedule operations for execution on the PPU 500. In an embodiment, multiple compute applications are simultaneously executed by the PPU 500 and the PPU 500 provides isolation, quality of service (QOS), and independent address spaces for the multiple compute applications. An application may generate instructions (e.g., API calls) that cause the driver kernel to generate one or more tasks for execution by the PPU 500. The driver kernel outputs tasks to one or more streams being processed by the PPU 500. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 7A.

Figure 6A:
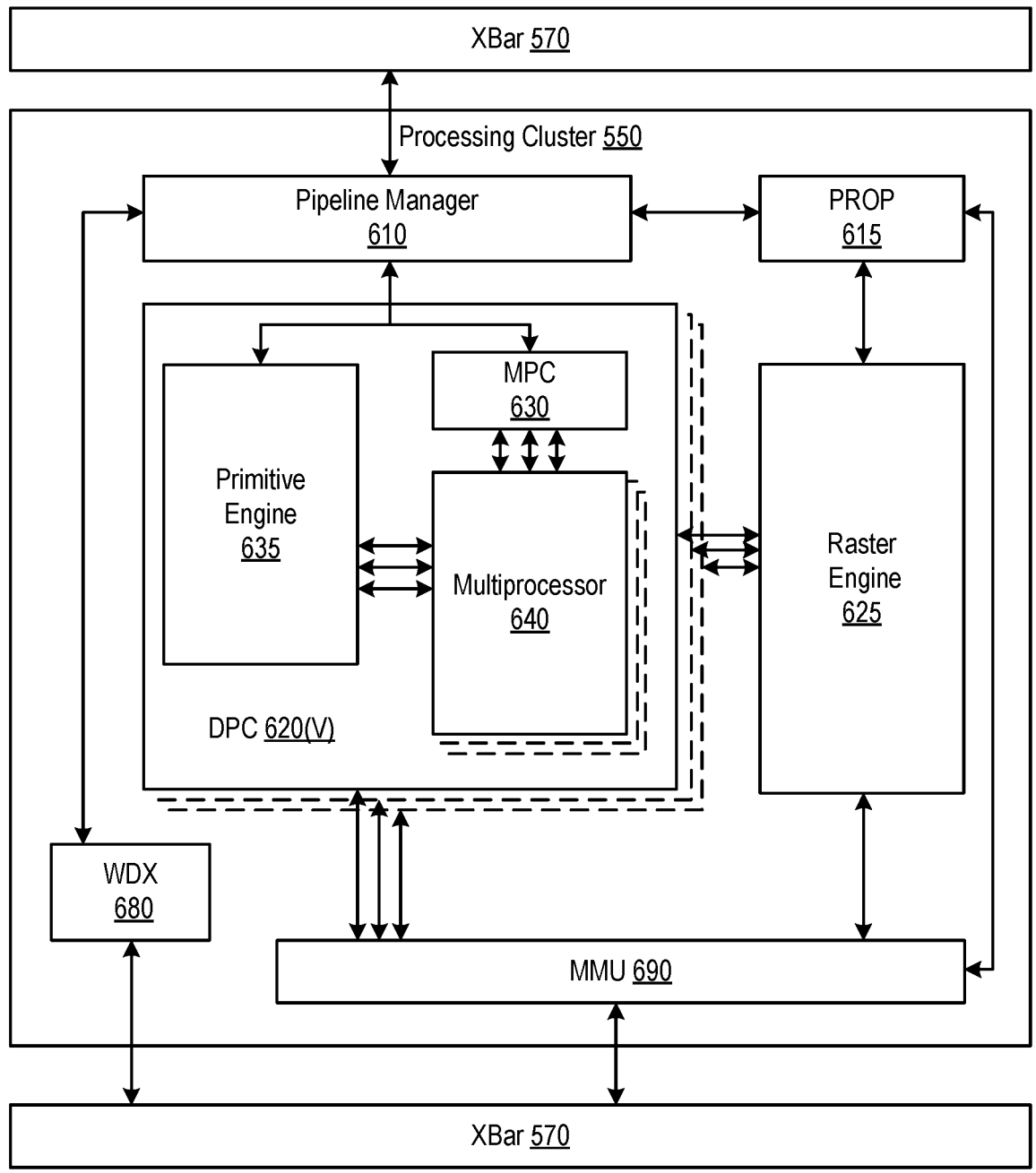
FIG. 6A illustrates a general processing cluster within the parallel processing unit of FIG. 3, in accordance with an embodiment.

FIG. 6A illustrates a processing cluster 550 of the PPU 500 of FIG. 5, in accordance with an embodiment. As shown in FIG. 6A, each processing cluster 550 includes a number of hardware units for processing tasks. In an embodiment, each processing cluster 550 includes a pipeline manager 610, a pre-raster operations unit (PROP) 615, a raster engine 625, a work distribution crossbar (WDX) 680, a memory management unit (MMU) 690, and one or more Data Processing Clusters (DPCs) 620. It will be appreciated that the processing cluster 550 of FIG. 6A may include other hardware units in lieu of or in addition to the units shown in FIG. 6A.

In an embodiment, the operation of the processing cluster 550 is controlled by the pipeline manager 610. The pipeline manager 610 manages the configuration of the one or more DPCs 620 for processing tasks allocated to the processing cluster 550. In an embodiment, the pipeline manager 610 may configure at least one of the one or more DPCs 620 to implement at least a portion of a graphics rendering pipeline. For example, a DPC 620 may be configured to execute a vertex shader program on the programmable multiprocessor 640. Multiprocessors 640 may generally include streaming multiprocessors, compute units, many integrated cores, and the like. The pipeline manager 610 may also be configured to route packets received from the work distribution unit 525 to the appropriate logical units within the processing cluster 550. For example, some packets may be routed to fixed function hardware units in the PROP 615 and/or raster engine 625 while other packets may be routed to the DPCs 620 for processing by the primitive engine 635 or the multiprocessor 640. In an embodiment, the pipeline manager 610 may configure at least one of the one or more DPCs 620 to implement a neural network model and/or a computing pipeline.

Figure 6B:
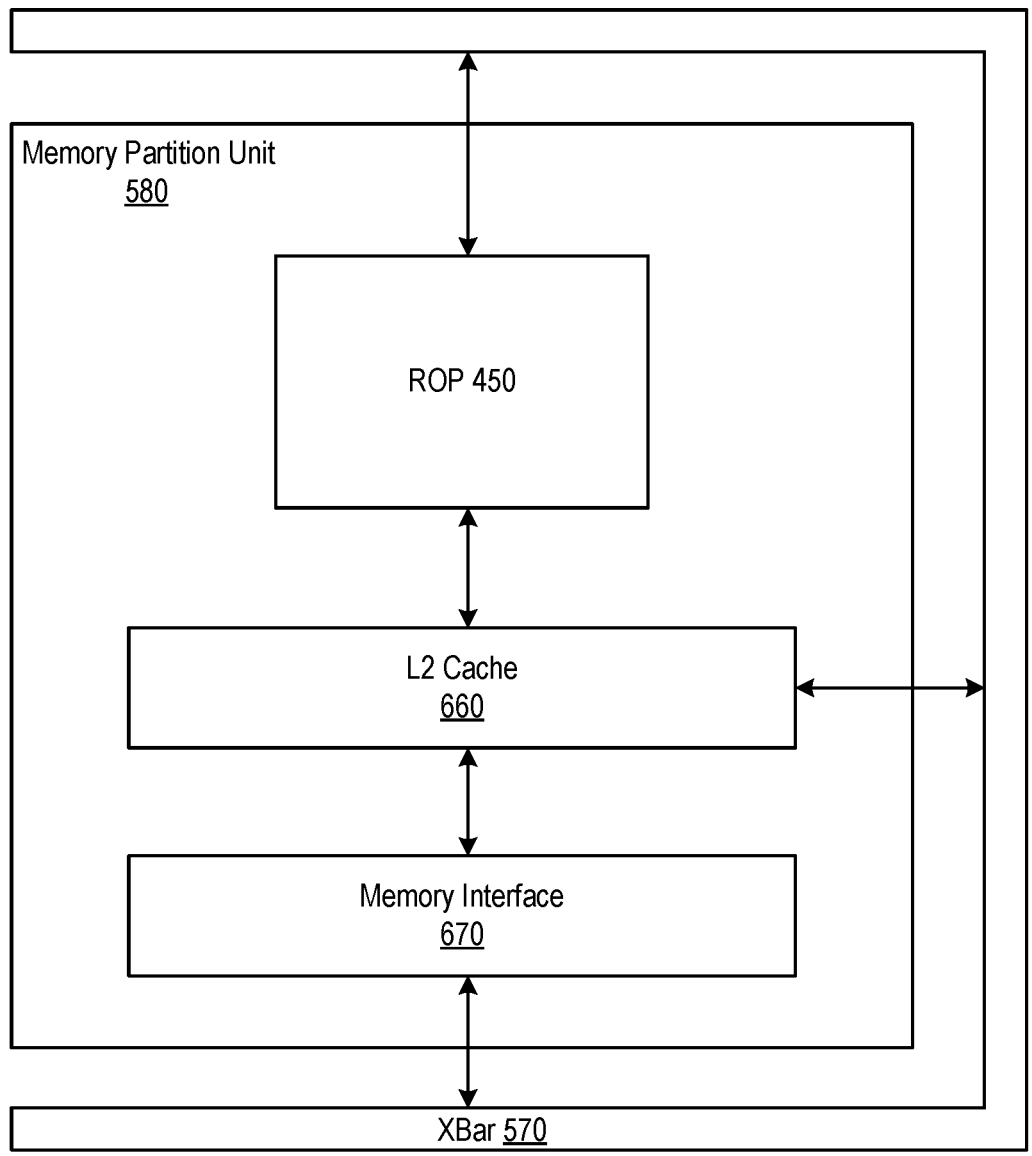
FIG. 6B illustrates a memory partition unit of the parallel processing unit of FIG. 5, in accordance with an embodiment.

The PROP unit 615 is configured to route data generated by the raster engine 625 and the DPCs 620 to a Raster Operations (ROP) unit, described in more detail in conjunction with FIG. 6B. The PROP unit 615 may also be configured to perform optimizations for color blending, organize pixel data, perform address translations, and the like.

The raster engine 625 includes a number of fixed function hardware units configured to perform various raster operations. In an embodiment, the raster engine 625 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 625 comprises fragments to be processed, for example, by a fragment shader implemented within a DPC 620.

Each DPC 620 included in the processing cluster 550 includes an M-Pipe Controller (MPC) 630, a primitive engine 635, and one or more Multiprocessors 640. The MPC 630 controls the operation of the DPC 620, routing packets received from the pipeline manager 610 to the appropriate units in the DPC 620. For example, packets associated with a vertex may be routed to the primitive engine 635, which is configured to fetch vertex attributes associated with the vertex from the memory 504. In contrast, packets associated with a shader program may be transmitted to the multiprocessor 640.

In some embodiments, the multiprocessor 640 comprises a programmable multiprocessor, such as a programmable streaming multiprocessor, that is configured to process tasks represented by a number of threads. Each multiprocessor 640 is multi-threaded and configured to execute a plurality of threads (e.g., 32 threads) from a particular warp concurrently. In an embodiment, the multiprocessor 640 implements a SIMD (Single-Instruction, Multiple-Data) architecture where each thread in a warp is configured to process a different set of data based on the same set of instructions. All threads in the warp execute the same instructions. In another embodiment, the multiprocessor 640 implements a SIMT (Single-Instruction, Multiple Thread) architecture where each thread in a warp is configured to process a different set of data based on the same set of instructions, but where individual threads in the warp are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The multiprocessor 640 will be described in more detail below in conjunction with FIG. 7A.

The MMU 690 provides an interface between the processing cluster 550 and the partition unit 580. The MMU 690 may provide translation of virtual addresses into physical addresses, memory protection, and arbitration of memory requests. In an embodiment, the MMU 690 provides one or more translation lookaside buffers (TLBs) for performing translation of virtual addresses into physical addresses in the memory 504.

FIG. 6B illustrates a memory partition unit 580 of the PPU 500 of FIG. 5, in accordance with an embodiment. As shown in FIG. 6B, the memory partition unit 580 includes a Raster Operations (ROP) unit 650, a level two (L2) cache 660, and a memory interface 670. The memory interface 670 is coupled to the memory 504. Memory interface 670 may implement 32, 64, 128, 1024-bit data buses, or the like, for high-speed data transfer. In an embodiment, the PPU 500 incorporates U memory interfaces 670, one memory interface 670 per pair of partition units 580, where each pair of partition units 580 is connected to a corresponding memory device 504. For example, PPU 500 may be connected to up to Y memory devices 504, such as high bandwidth memory stacks or graphics double-data-rate, version 5, synchronous dynamic random-access memory, or other types of persistent storage.

In an embodiment, the memory interface 670 implements an HBM2 memory interface and Y equals half U. In an embodiment, the HBM2 memory stacks are located on the same physical package as the PPU 500, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 504 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 500 process very large datasets and/or run applications for extended periods.

In an embodiment, the PPU 500 implements a multi-level memory hierarchy. In an embodiment, the memory partition unit 580 supports a unified memory to provide a single unified virtual address space for CPU and PPU 500 memory, enabling data sharing between virtual memory systems. In an embodiment the frequency of accesses by a PPU 500 to memory located on other processors is traced to ensure that memory pages are moved to the physical memory of the PPU 500 that is accessing the pages more frequently. In an embodiment, the NVLink 510 supports address translation services allowing the PPU 500 to directly access a CPU's page tables and providing full access to CPU memory by the PPU 500.

In an embodiment, copy engines transfer data between multiple PPUs 500 or between PPUs 500 and CPUs. The copy engines can generate page faults for addresses that are not mapped into the page tables. The memory partition unit 580 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 504 or other system memory may be fetched by the memory partition unit 580 and stored in the L2 cache 660, which is located on-chip and is shared between the various processing clusters 550. As shown, each memory partition unit 580 includes a portion of the L2 cache 660 associated with a corresponding memory device 504. Lower-level caches may then be implemented in various units within the processing clusters 550. For example, each of the multiprocessors 640 may implement a level one (L1) cache. The L1 cache is private memory that is dedicated to a particular multiprocessor 640. Data from the L2 cache 660 may be fetched and stored in each of the L1 caches for processing in the functional units of the Multiprocessors 640. The L2 cache 660 is coupled to the memory interface 670 and the XBar 570.

The ROP unit 650 performs graphics raster operations related to pixel color, such as color compression, pixel blending, and the like. The ROP unit 650 also implements depth testing in conjunction with the raster engine 625, receiving a depth for a sample location associated with a pixel fragment from the culling engine of the raster engine 625. The depth is tested against a corresponding depth in a depth buffer for a sample location associated with the fragment. If the fragment passes the depth test for the sample location, then the ROP unit 650 updates the depth buffer and transmits a result of the depth test to the raster engine 625. It will be appreciated that the number of partition units 580 may be different than the number of processing clusters 550 and, therefore, each ROP unit 650 may be coupled to each of the processing clusters 550. The ROP unit 650 tracks packets received from the different processing clusters 550 and determines which processing cluster 550 that a result generated by the ROP unit 650 is routed to through the Xbar 570. Although the ROP unit 650 is included within the memory partition unit 580 in FIG. 6B, in other embodiment, the ROP unit 650 may be outside of the memory partition unit 580. For example, the ROP unit 650 may reside in the processing cluster 550 or another unit.

Figure 7A:
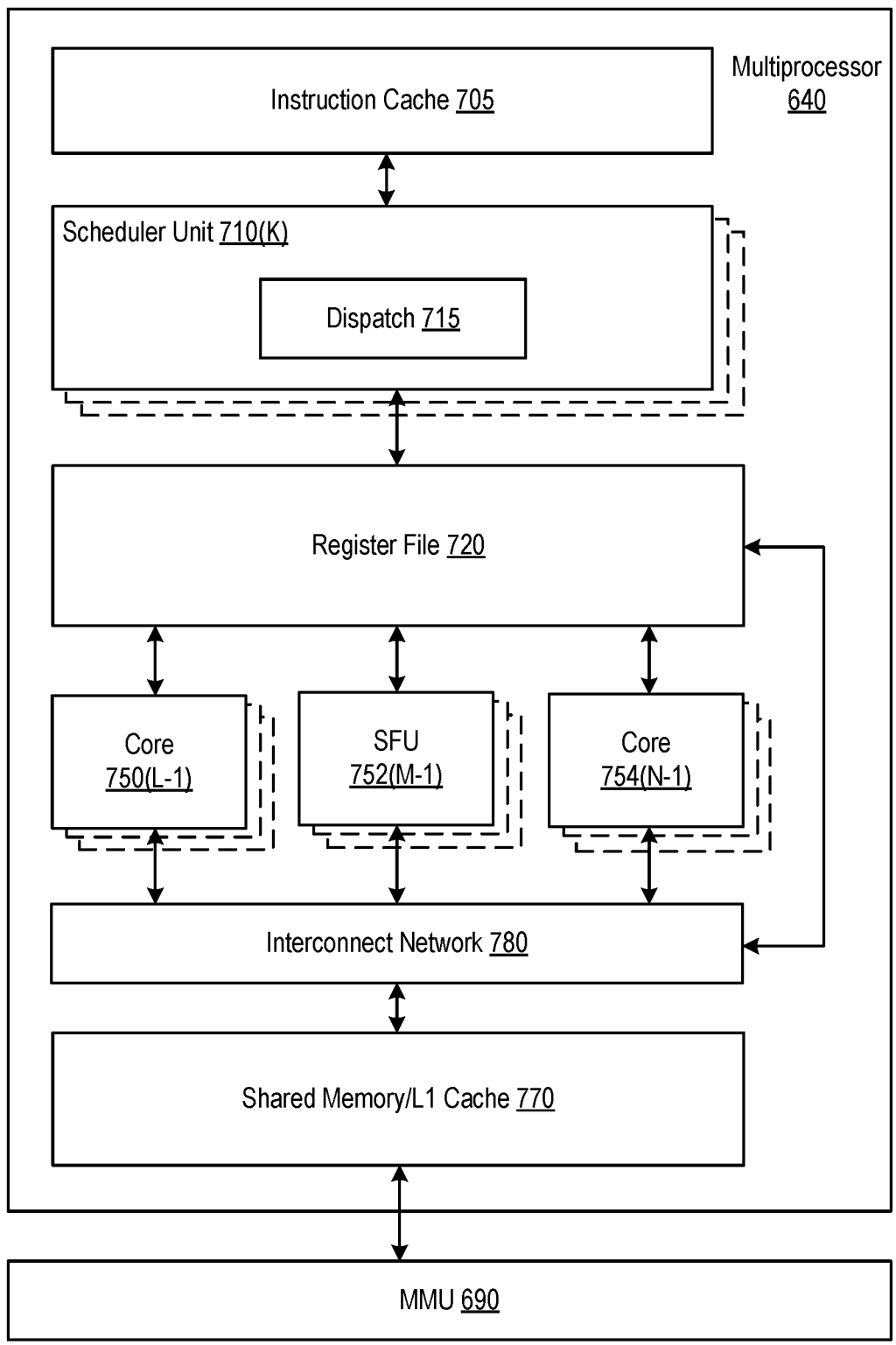
FIG. 7A illustrates the streaming multi-processor of FIG. 6A, in accordance with an embodiment.

FIG. 7A illustrates the multiprocessor 640 of FIG. 6A, in accordance with an embodiment. As shown in FIG. 7A, the multiprocessor 640 includes an instruction cache 705, one or more scheduler units 710, a register file 720, one or more processing cores 750, one or more special function units (SFUs) 752, one or more load/store units (LSUs) 754, an interconnect network 780, a shared memory/L1 cache 770.

As described above, the work distribution unit 525 dispatches tasks for execution on the processing clusters 550 of the PPU 500. The tasks are allocated to a particular DPC 620 within a processing cluster 550 and, if the task is associated with a shader program, the task may be allocated to a multiprocessor 640. The scheduler unit 710 receives the tasks from the work distribution unit 525 and manages instruction scheduling for one or more thread blocks assigned to the multiprocessor 640. The scheduler unit 710 schedules thread blocks for execution as warps of parallel threads, where each thread block is allocated at least one warp. In an embodiment, each warp executes 32 threads. The scheduler unit 710 may manage a plurality of different thread blocks, allocating the warps to the different thread blocks and then dispatching instructions from the plurality of different cooperative groups to the various functional units (e.g., cores 750, SFUs 752, and LSUs 754) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define warps at smaller than thread block granularities and synchronize within the defined groups to enable greater performance, design flexibility, and software reuse in the form of collective group-wide function interfaces.

Cooperative Groups enables programmers to define warps explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 715 is configured to transmit instructions to one or more of the functional units. In the embodiment, the scheduler unit 710 includes two dispatch units 715 that enable two different instructions from the same warp to be dispatched during each clock cycle. In alternative embodiments, each scheduler unit 710 may include a single dispatch unit 715 or additional dispatch units 715.

Each multiprocessor 640 includes a register file 720 that provides a set of registers for the functional units of the multiprocessor 640. In an embodiment, the register file 720 is divided between each of the functional units such that each functional unit is allocated a dedicated portion of the register file 720. In another embodiment, the register file 720 is divided between the different warps being executed by the multiprocessor 640. The register file 720 provides temporary storage for operands connected to the data paths of the functional units.

Each multiprocessor 640 comprises L processing cores 750. In an embodiment, the multiprocessor 640 includes a large number (e.g., 128, etc.) of distinct processing cores 750. Each core 750 may include a fully-pipelined, single-precision, double-precision, and/or mixed precision processing unit that includes a floating-point arithmetic logic unit and an integer arithmetic logic unit. In an embodiment, the floating-point arithmetic logic units implement the IEEE 754-2008 standard for floating point arithmetic. In an embodiment, the cores 750 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 750. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each multiprocessor 640 also comprises M SFUs 752 that perform special functions (e.g., attribute evaluation, reciprocal square root, and the like). In an embodiment, the SFUs 752 may include a tree traversal unit configured to traverse a hierarchical tree data structure. In an embodiment, the SFUs 752 may include texture unit configured to perform texture map filtering operations. In an embodiment, the texture units are configured to load texture maps (e.g., a 2D array of texels) from the memory 504 and sample the texture maps to produce sampled texture values for use in shader programs executed by the multiprocessor 640. In an embodiment, the texture maps are stored in the shared memory/L1 cache 670. The texture units implement texture operations such as filtering operations using mip-maps (e.g., texture maps of varying levels of detail). In an embodiment, each SM 540 includes two texture units.

Each multiprocessor 640 also comprises N LSUs 754 that implement load and store operations between the shared memory/L1 cache 770 and the register file 720. Each multiprocessor 640 includes an interconnect network 780 that connects each of the functional units to the register file 720 and the LSU 754 to the register file 720, shared memory/L1 cache 770. In an embodiment, the interconnect network 780 is a crossbar that can be configured to connect any of the functional units to any of the registers in the register file 720 and connect the LSUs 754 to the register file and memory locations in shared memory/L1 cache 770.

The shared memory/L1 cache 770 is an array of on-chip memory that allows for data storage and communication between the multiprocessor 640 and the primitive engine 635 and between threads in the multiprocessor 640. In an embodiment, the shared memory/L1 cache 770 comprises 128 KB of storage capacity and is in the path from the multiprocessor 640 to the partition unit 580. The shared memory/L1 cache 770 can be used to cache reads and writes. One or more of the shared memory/L1 cache 770, L2 cache 660, and memory 504 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 770 enables the shared memory/L1 cache 770 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 5, are bypassed, creating a much simpler programming model. In the general-purpose parallel computation configuration, the work distribution unit 525 assigns and distributes blocks of threads directly to the DPCs 620. The threads in a block execute the same program, using a unique thread ID in the calculation to ensure each thread generates unique results, using the multiprocessor 640 to execute the program and perform calculations, shared memory/L1 cache 770 to communicate between threads, and the LSU 754 to read and write global memory through the shared memory/L1 cache 770 and the memory partition unit 580. When configured for general purpose parallel computation, the multiprocessor 640 can also write commands that the scheduler unit 520 can use to launch new work on the DPCs 620.

The PPU 500 may be included in a desktop computer, a laptop computer, a tablet computer, servers, supercomputers, a smart phone (e.g., a wireless, hand-held device), personal digital assistant (PDA), a digital camera, a vehicle, a head mounted display, a hand-held electronic device, and the like. In an embodiment, the PPU 500 is embodied on a single semiconductor substrate. In another embodiment, the PPU 500 is included in a system-on-a-chip (SoC) along with one or more other devices such as additional PPUs 500, the memory 504, a reduced instruction set computer (RISC) CPU, a memory management unit (MMU), a digital-to-analog converter (DAC), and the like.

In an embodiment, the PPU 500 may be included on a graphics card that includes one or more memory devices 504. The graphics card may be configured to interface with a PCIe slot on a motherboard of a desktop computer. In yet another embodiment, the PPU 500 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 7B:
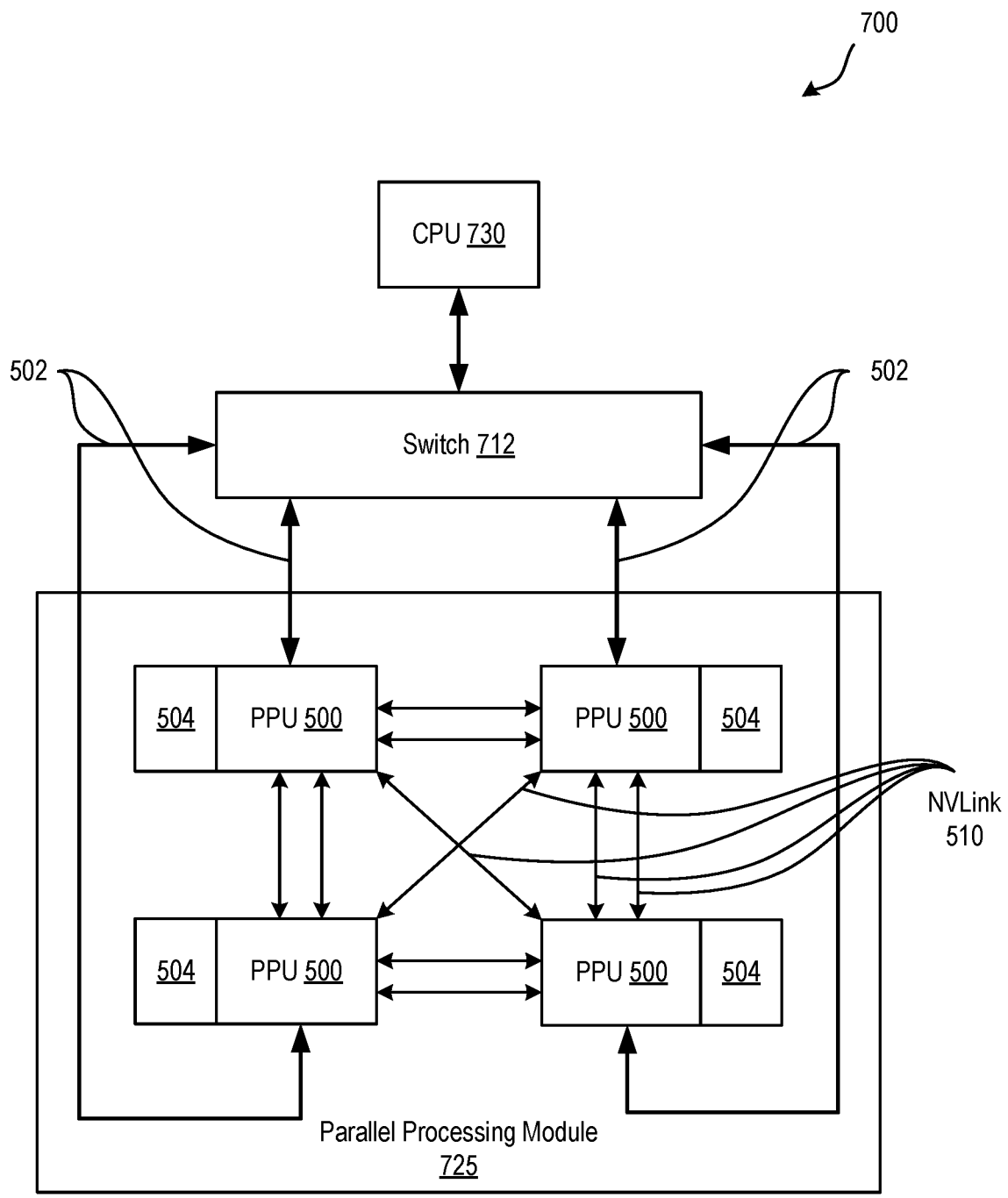
FIG. 7B is a conceptual diagram of a processing system implemented using the PPU of FIG. 5, in accordance with an embodiment.

FIG. 7B is a conceptual diagram of a processing system 700 implemented using the PPU 500 of FIG. 5, in accordance with an embodiment. The exemplary system 765 may be configured to implement the method 400 shown in FIG. 4. The processing system 700 includes a CPU 730, switch 712, and multiple PPUs 500 each and respective memories 504. The NVLink 510 provides high-speed communication links between each of the PPUs 500. Although a particular number of NVLink 510 and interconnect 502 connections are illustrated in FIG. 7B, the number of connections to each PPU 500 and the CPU 730 may vary. The switch 712 interfaces between the interconnect 502 and the CPU 730. The PPUs 500, memories 504, and NVLinks 510 may be situated on a single semiconductor platform to form a parallel processing module 725. In an embodiment, the switch 712 supports two or more protocols to interface between various different connections and/or links.

In another embodiment (not shown), the NVLink 510 provides one or more high-speed communication links between each of the PPUs 500 and the CPU 730 and the switch 712 interfaces between the interconnect 502 and each of the PPUs 500. The PPUs 500, memories 504, and interconnect 502 may be situated on a single semiconductor platform to form a parallel processing module 725. In yet another embodiment (not shown), the interconnect 502 provides one or more communication links between each of the PPUs 500 and the CPU 730 and the switch 712 interfaces between each of the PPUs 500 using the NVLink 510 to provide one or more high-speed communication links between the PPUs 500. In another embodiment (not shown), the NVLink 510 provides one or more high-speed communication links between the PPUs 500 and the CPU 730 through the switch 712. In yet another embodiment (not shown), the interconnect 502 provides one or more communication links between each of the PPUs 500 directly. One or more of the NVLink 510 high-speed communication links may be implemented as a physical NVLink interconnect or either an on-chip or on-die interconnect using the same protocol as the NVLink 510.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 725 may be implemented as a circuit board substrate and each of the PPUs 500 and/or memories 504 may be packaged devices. In an embodiment, the CPU 730, switch 712, and the parallel processing module 725 are situated on a single semiconductor platform.

In an embodiment, the signaling rate of each NVLink 510 is 20 to 25 Gigabits/second and each PPU 500 includes six NVLink 510 interfaces (as shown in FIG. 7B, five NVLink 510 interfaces are included for each PPU 500). Each NVLink 510 provides a data transfer rate of 25 Gigabytes/second in each direction, with six links providing 500 Gigabytes/second. The NVLinks 510 can be used exclusively for PPU-to-PPU communication as shown in FIG. 7B, or some combination of PPU-to-PPU and PPU-to-CPU, when the CPU 730 also includes one or more NVLink 510 interfaces.

In an embodiment, the NVLink 510 allows direct load/store/atomic access from the CPU 730 to each PPU's 500 memory 504. In an embodiment, the NVLink 510 supports coherency operations, allowing data read from the memories 504 to be stored in the cache hierarchy of the CPU 730, reducing cache access latency for the CPU 730. In an embodiment, the NVLink 510 includes support for Address Translation Services (ATS), allowing the PPU 500 to directly access page tables within the CPU 730. One or more of the NVLinks 510 may also be configured to operate in a low-power mode.

Figure 7C:
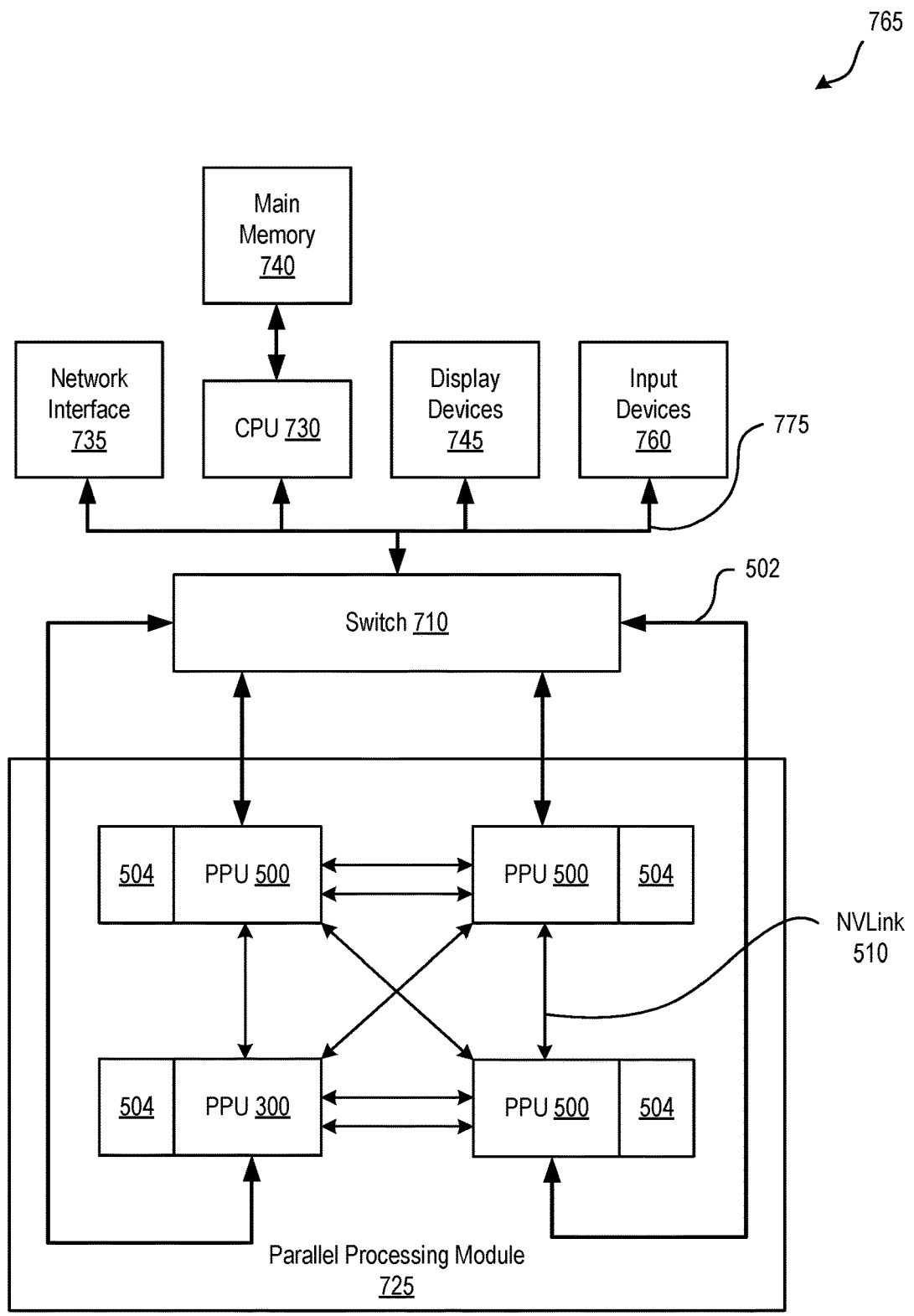
FIG. 7C illustrates an exemplary system in which the various architecture and/or functionality of the various previous embodiments may be implemented.

FIG. 7C illustrates an exemplary system 765 in which the various architecture and/or functionality of the various previous embodiments may be implemented. The exemplary system 765 may be configured to implement the method 400 shown in FIG. 4.

As shown, a system 765 is provided including at least one central processing unit 730 that is connected to a communication bus 775. The communication bus 775 may be implemented using any suitable protocol, such as PCI (Peripheral Component Interconnect), PCI-Express, AGP (Accelerated Graphics Port), HyperTransport, or any other bus or point-to-point communication protocol(s). The system 765 also includes a main memory 740. Control logic (software) and data are stored in the main memory 740 which may take the form of random-access memory (RAM).

The system 765 also includes input devices 760, the parallel processing system 725, and display devices 745, e.g., a conventional CRT (cathode ray tube), LCD (liquid crystal display), LED (light emitting diode), plasma display or the like. User input may be received from the input devices 760, e.g., keyboard, mouse, touchpad, microphone, and the like. Each of the foregoing modules and/or devices may even be situated on a single semiconductor platform to form the system 765. Alternately, the various modules may also be situated separately or in various combinations of semiconductor platforms per the desires of the user.

Further, the system 765 may be coupled to a network (e.g., a telecommunications network, local area network (LAN), wireless network, wide area network (WAN) such as the Internet, peer-to-peer network, cable network, or the like) through a network interface 735 for communication purposes.

The system 765 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 740 and/or the secondary storage. Such computer programs, when executed, enable the system 765 to perform various functions. The memory 740, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 765 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (e.g., pixel data for each of the pixels of the display).

An application writes model data for a scene (e.g., a collection of vertices and attributes) to a memory such as a system memory or memory 504. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the multiprocessors 640 of the PPU 500 including one or more of a vertex shader, hull shader, domain shader, geometry shader, and a pixel shader. For example, one or more of the multiprocessors 640 may be configured to execute a vertex shader program that processes a number of vertices defined by the model data. In an embodiment, the different multiprocessors 640 may be configured to execute different shader programs concurrently. For example, a first subset of multiprocessors 640 may be configured to execute a vertex shader program while a second subset of multiprocessors 640 may be configured to execute a pixel shader program. The first subset of multiprocessors 640 processes vertex data to produce processed vertex data and writes the processed vertex data to the L2 cache 460 and/or the memory 504. After the processed vertex data is rasterized (e.g., transformed from three-dimensional data into two-dimensional data in screen space) to produce fragment data, the second subset of multiprocessors 640 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 8:
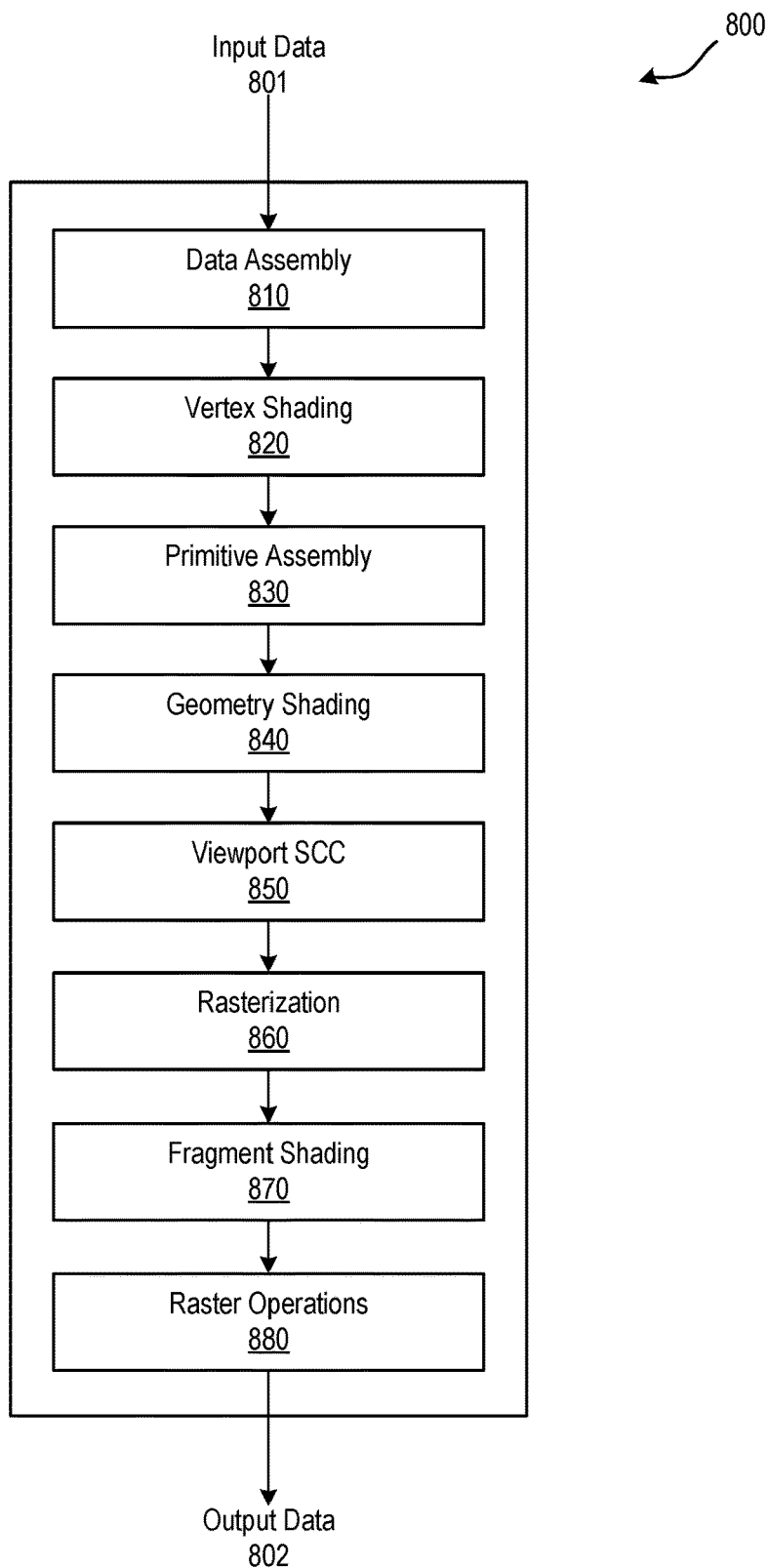
FIG. 8 is a conceptual diagram of a graphics processing pipeline implemented by the PPU of FIG. 5, in accordance with an embodiment.

FIG. 8 is a conceptual diagram of a graphics processing pipeline 800 implemented by the PPU 500 of FIG. 5, in accordance with an embodiment. The graphics processing pipeline 800 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 800 receives input data 801 that is transmitted from one stage to the next stage of the graphics processing pipeline 800 to generate output data 802. In an embodiment, the graphics processing pipeline 800 may represent a graphics processing pipeline defined by the OpenGL® API. As an option, the graphics processing pipeline 800 may be implemented in the context of the functionality and architecture of the previous Figures and/or any subsequent Figure(s).

As shown in FIG. 8, the graphics processing pipeline 800 comprises a pipeline architecture that includes a number of stages. The stages include, but are not limited to, a data assembly stage 810, a vertex shading stage 820, a primitive assembly stage 830, a geometry shading stage 840, a viewport scale, cull, and clip (VSCC) stage 850, a rasterization stage 860, a fragment shading stage 870, and a raster operations stage 880. In an embodiment, the input data 801 comprises commands that configure the processing units to implement the stages of the graphics processing pipeline 800 and geometric primitives (e.g., points, lines, triangles, quads, triangle strips or fans, etc.) to be processed by the stages. The output data 802 may comprise pixel data (e.g., color data) that is copied into a frame buffer or other type of surface data structure in a memory.

The data assembly stage 810 receives the input data 801 that specifies vertex data for high-order surfaces, primitives, or the like. The data assembly stage 810 collects the vertex data in a temporary storage or queue, such as by receiving a command from the host processor that includes a pointer to a buffer in memory and reading the vertex data from the buffer. The vertex data is then transmitted to the vertex shading stage 820 for processing.

The vertex shading stage 820 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 820 may manipulate individual vertex attributes such as position, color, texture coordinates, and the like. In other words, the vertex shading stage 820 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 820 generates transformed vertex data that is transmitted to the primitive assembly stage 830.

The primitive assembly stage 830 collects vertices output by the vertex shading stage 820 and groups the vertices into geometric primitives for processing by the geometry shading stage 840. For example, the primitive assembly stage 830 may be configured to group every three consecutive vertices as a geometric primitive (e.g., a triangle) for transmission to the geometry shading stage 840. In some embodiments, specific vertices may be reused for consecutive geometric primitives (e.g., two consecutive triangles in a triangle strip may share two vertices). The primitive assembly stage 830 transmits geometric primitives (e.g., a collection of associated vertices) to the geometry shading stage 840.

The geometry shading stage 840 processes geometric primitives by performing a set of operations (e.g., a geometry shader or program) on the geometric primitives. Tessellation operations may generate one or more geometric primitives from each geometric primitive. In other words, the geometry shading stage 840 may subdivide each geometric primitive into a finer mesh of two or more geometric primitives for processing by the rest of the graphics processing pipeline 800. The geometry shading stage 840 transmits geometric primitives to the viewport SCC stage 850.

In an embodiment, the graphics processing pipeline 800 may operate within a multiprocessor and the vertex shading stage 820, the primitive assembly stage 830, the geometry shading stage 840, the fragment shading stage 870, and/or hardware/software associated therewith, may sequentially perform processing operations. Once the sequential processing operations are complete, in an embodiment, the viewport SCC stage 850 may utilize the data. In an embodiment, primitive data processed by one or more of the stages in the graphics processing pipeline 800 may be written to a cache (e.g., L1 cache, a vertex cache, etc.). In this case, in an embodiment, the viewport SCC stage 850 may access the data in the cache. In an embodiment, the viewport SCC stage 850 and the rasterization stage 860 are implemented as fixed function circuitry.

The viewport SCC stage 850 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 860.

The rasterization stage 860 converts the 3D geometric primitives into 2D fragments (e.g., capable of being utilized for display, etc.). The rasterization stage 860 may be configured to utilize the vertices of the geometric primitives to setup a set of plane equations from which various attributes can be interpolated. The rasterization stage 860 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 860 generates fragment data (e.g., interpolated vertex attributes associated with a particular sample location for each covered pixel) that are transmitted to the fragment shading stage 870.

The fragment shading stage 870 processes fragment data by performing a set of operations (e.g., a fragment shader or a program) on each of the fragments. The fragment shading stage 870 may generate pixel data (e.g., color values) for the fragment such as by performing lighting operations or sampling texture maps using interpolated texture coordinates for the fragment. The fragment shading stage 870 generates pixel data that is transmitted to the raster operations stage 880.

The raster operations stage 880 may perform various operations on the pixel data such as performing alpha tests, stencil tests, and blending the pixel data with other pixel data corresponding to other fragments associated with the pixel. When the raster operations stage 880 has finished processing the pixel data (e.g., the output data 802), the pixel data may be written to a render target such as a frame buffer, a color buffer, or the like.

It will be appreciated that one or more additional stages may be included in the graphics processing pipeline 800 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 840).

Other types of graphics processing pipelines are contemplated as being within the scope of the present disclosure. Furthermore, any of the stages of the graphics processing pipeline 800 may be implemented by one or more dedicated hardware units within a graphics processor such as PPU 500. Other stages of the graphics processing pipeline 800 may be implemented by programmable hardware units such as the multiprocessors 640 of the PPU 500.

The graphics processing pipeline 800 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 500. The API provides an abstraction for a programmer that lets a programmer utilize specialized graphics hardware, such as the PPU 500, to generate the graphical data without requiring the programmer to utilize the specific instruction set for the PPU 500. The application may include an API call that is routed to the device driver for the PPU 500. The device driver interprets the API call and performs various operations to respond to the API call. In some instances, the device driver may perform operations by executing instructions on the CPU. In other instances, the device driver may perform operations, at least in part, by launching operations on the PPU 500 utilizing an input/output interface between the CPU and the PPU 500. In an embodiment, the device driver is configured to implement the graphics processing pipeline 800 utilizing the hardware of the PPU 500.

Various programs may be executed within the PPU 500 in order to implement the various stages of the graphics processing pipeline 800. For example, the device driver may launch a kernel on the PPU 500 to perform the vertex shading stage 820 on one multiprocessors 640 (or multiple multiprocessors 640). The device driver (or the initial kernel executed by the PPU 500) may also launch other kernels on the PPU 500 to perform other stages of the graphics processing pipeline 800, such as the geometry shading stage 840 and the fragment shading stage 870. In addition, some of the stages of the graphics processing pipeline 800 may be implemented on fixed unit hardware such as a rasterizer or a data assembler implemented within the PPU 500. It will be appreciated that results from one kernel may be processed by one or more intervening fixed function hardware units before being processed by a subsequent kernel on an multiprocessors 640.

Machine Learning

Deep neural networks (DNNs) developed on processors, such as the PPU 500 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 500. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 500 is a computing platform capable of delivering performance required for deep neural network-based artificial intelligence and machine learning applications.

What is claimed is:

1. A parallel processing unit (PPU) comprising:
a plurality of subpartition units configured to execute threads;
a cache coupled to the plurality of subpartition units; and
a request coalescer coupled to the plurality of subpartition units and the cache, wherein the request coalescer is to:
receive a first instruction to load a first data into a first register file associated with a first subpartition unit of the plurality of subpartition units;
receive a second instruction to load the first data into a second register file associated with a second subpartition unit of the plurality of subpartition units;
coalesce the first instruction and the second instruction into a first entry of the request coalescer based on instruction identifiers, wherein the first entry is associated with the first data;
determine that the first data is available in the cache; and
responsive to the determination that the first data is available in the cache, multicast the first data from the cache to the first register file and the second register file.

2. The PPU of claim 1, further comprising:
a first writeback buffer associated with the first register file, wherein the request coalescer is to write the first data to the first writeback buffer, wherein the first writeback buffer holds the first data until the first register file is available for writeback; and
a second writeback buffer associated with the second register file, wherein the request coalescer is to write the first data to the first second writeback buffer, wherein the second writeback buffer holds the first data until the second register file is available for writeback.

3. The PPU of claim 2, wherein, to multicast the first data from the cache to the first register file and the second register file, the request coalescer is to:
write the first data to the first writeback buffer and the second writeback buffer.

4. The PPU of claim 1, wherein the first instruction and the second instruction are a same instruction as executed by respective threads.

5. The PPU of claim 1, wherein the cache is configured to store constant data.

6. The PPU of claim 1, wherein, to coalesce the first instruction and the second instruction into the first entry of the request coalescer based on instruction identifiers, the request coalescer is to:
identify an instruction identifier associated with the first entry of the request coalescer;
determine that the instruction identifier associated with the first entry matches respective instruction identifiers associated with the first instruction and the second instruction; and
merge the first instruction and the second instruction into the first entry.

7. The PPU of claim 6, wherein the instruction identifier comprises at least one of a destination register number, a write scoreboard identifier, a load size, an opcode, a cache line identifier, a program counter, or a cache tag identifier.

8. The PPU of claim 1, wherein the request coalescer is further to:
responsive to the multicasting of the first data from the cache to the first register file and the second register file, remove the first entry from the request coalescer.

9. The PPU of claim 1, wherein instructions are received into the request coalescer according to an arbitration scheme.

10. The PPU of claim 1, wherein the cache is a read-only cache.

11. A parallel processor comprising:
a plurality of multiprocessors, each having a cache and a request coalescer, wherein the request coalescer is to:
receive a first instruction to load a first data into a first register file;
receive a second instruction to load the first data into a second register file;
coalesce the first instruction and the second instruction into a first entry of the request coalescer based on instruction identifiers, wherein the first entry is associated with the first data;
determine that the first data is available in the cache; and
responsive to the determination that the first data is available in the cache, multicast the first data from the cache to the first register file and the second register file.

12. The parallel processor of claim 11, further comprising:
a first writeback buffer associated with the first register file, wherein the request coalescer is to write the first data to the first writeback buffer, wherein the first writeback buffer holds the first data until the first register file is available for writeback; and
a second writeback buffer associated with the second register file, wherein the request coalescer is to write the first data to the second writeback buffer, wherein the second writeback buffer holds the first data until the second register file is available for writeback.

13. The parallel processor of claim 12, wherein, to multicast the first data from the cache to the first register file and the second register file, the request coalescer is to:
write the first data to the first writeback buffer and the second writeback buffer.

14. The parallel processor of claim 11, wherein each of the plurality of multiprocessors further comprises a plurality of subpartition units, wherein the first instruction is associated with a first subpartition unit of the plurality of subpartition units and the second instruction is associated with a second subpartition unit of the plurality of subpartition units.

15. The parallel processor of claim 11, wherein the first instruction and the second instruction are a same instruction as executed by respective threads.

16. The parallel processor of claim 11, wherein the cache is configured to store constant data.

17. The parallel processor of claim 11, wherein, to coalesce the first instruction and the second instruction into the first entry of the request coalescer, the request coalescer is to:
- identify an instruction identifier associated with the first entry of the request coalescer;
- determine that the instruction identifier associated with the first entry matches respective instruction identifiers associated with the first instruction and the second instruction; and
- merge the first instruction and the second instruction into the first entry.

18. The parallel processor of claim 17, wherein the instruction identifier comprises at least one of a destination register number, a write scoreboard identifier, a load size, an opcode, a cache line identifier, a program counter, or a cache tag identifier.

19. The parallel processor of claim 11, wherein the request coalescer is further to:
- responsive to the multicasting of the first data from the cache to the first register file and the second register file, remove the first entry from the request coalescer.

20. A method comprising:
- receiving a first instruction to load a first data into a first register file associated with a first subpartition unit of a plurality of subpartition units;
- receiving a second instruction to load the first data into a second register file associated with a second subpartition unit of the plurality of subpartition units;
- coalescing the first instruction and the second instruction into a first entry of a request coalescer based on instruction identifiers, wherein the first entry is associated with the first data;
- determining that the first data is available in a cache associated with the plurality of subpartition units; and
- responsive to determining that the first data is available in the cache, multicasting the first data from the cache to the first register file and the second register file.

* * * * *